Nov. 29, 1938.                G. G. GOING                2,138,151
                    TYPEWRITING AND LIKE MACHINE
                    Filed Dec. 20, 1934        17 Sheets-Sheet 3

INVENTOR
GEORGE G. GOING
BY
ATTORNEY

Nov. 29, 1938.  G. G. GOING  2,138,151
TYPEWRITING AND LIKE MACHINE
Filed Dec. 20, 1934  17 Sheets-Sheet 4
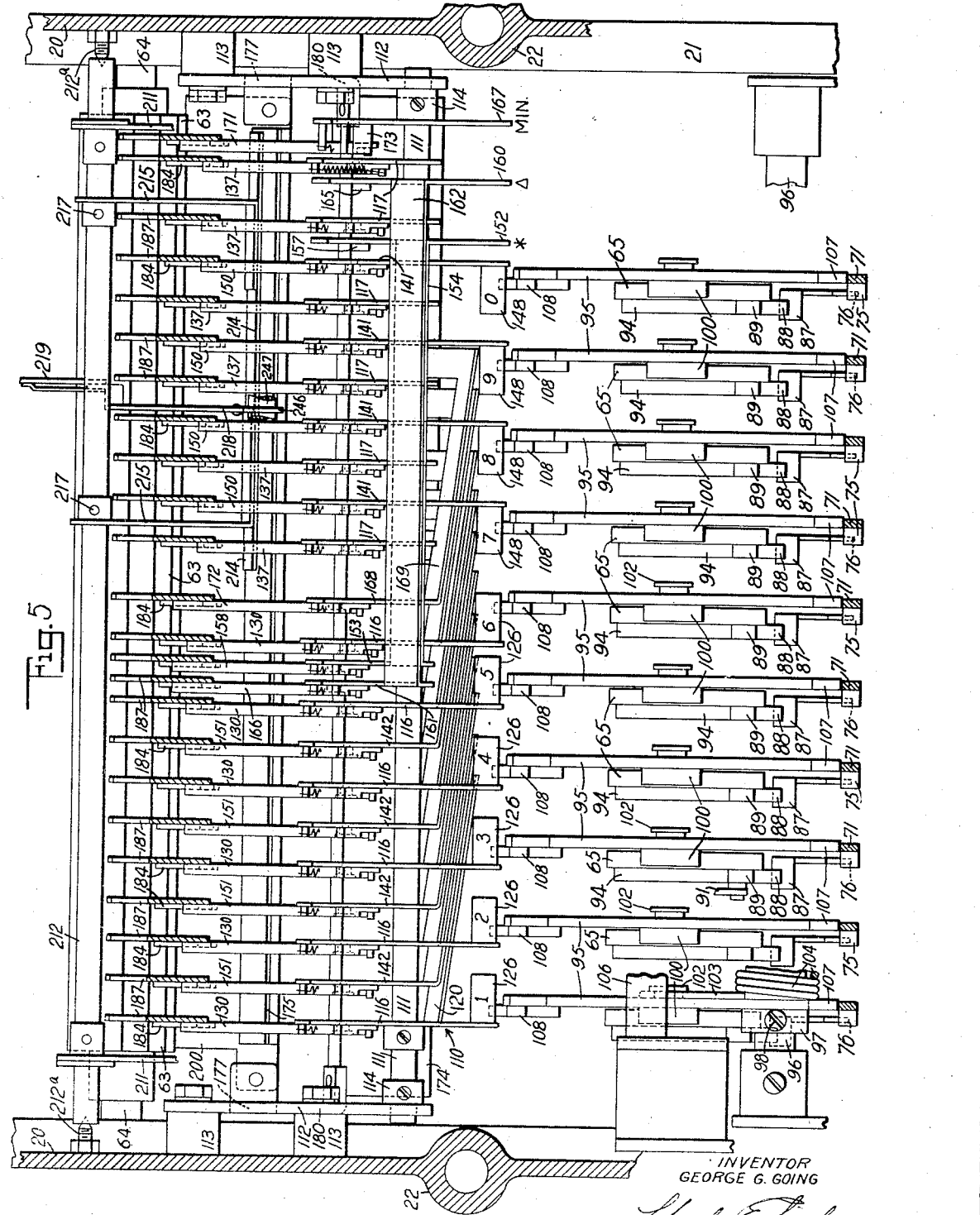
INVENTOR
GEORGE G. GOING
BY *Charles E. Smith*
ATTORNEY Nov. 29, 1938.　　　　G. G. GOING　　　　2,138,151
TYPEWRITING AND LIKE MACHINE
Filed Dec. 20, 1934　　17 Sheets-Sheet 5
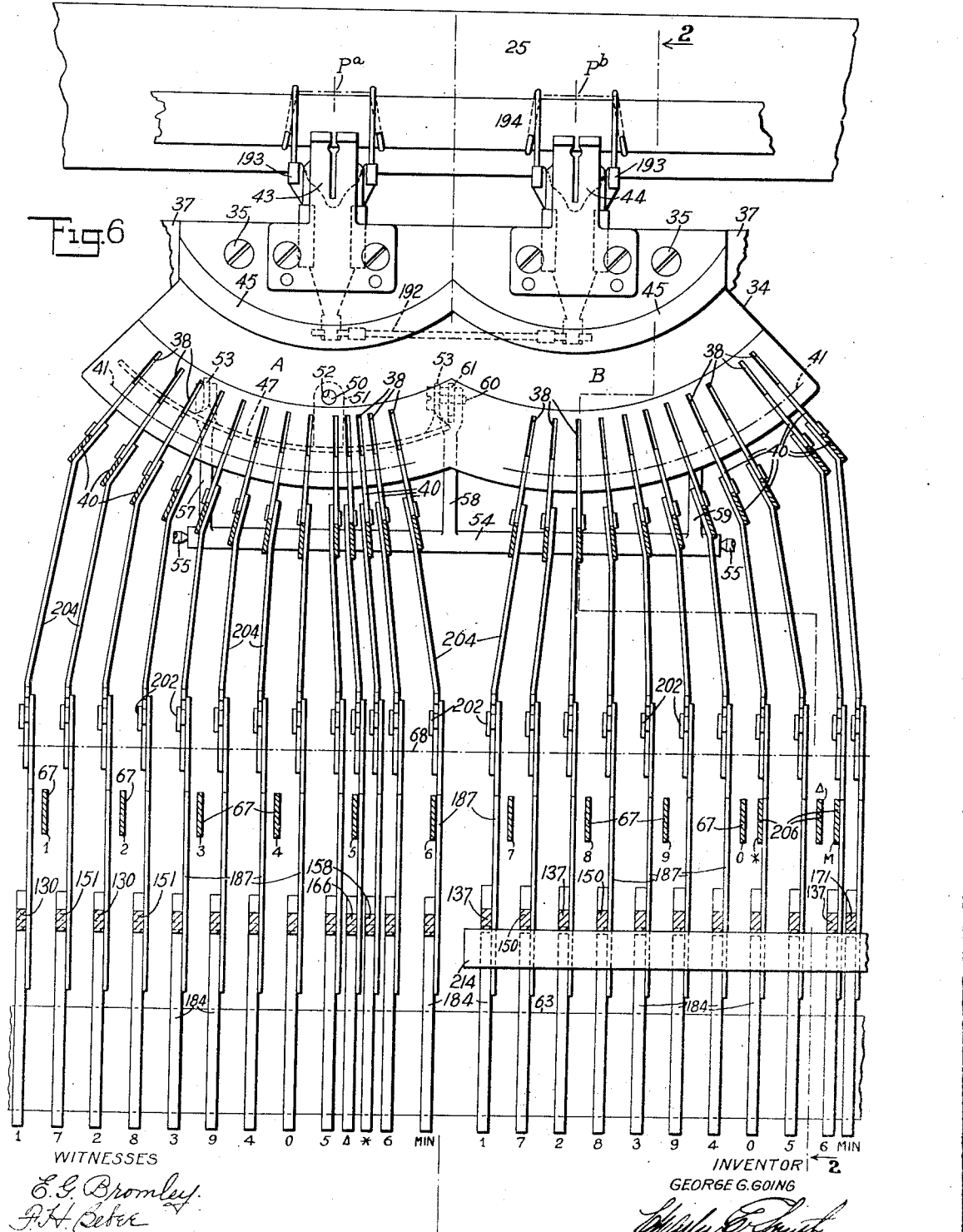

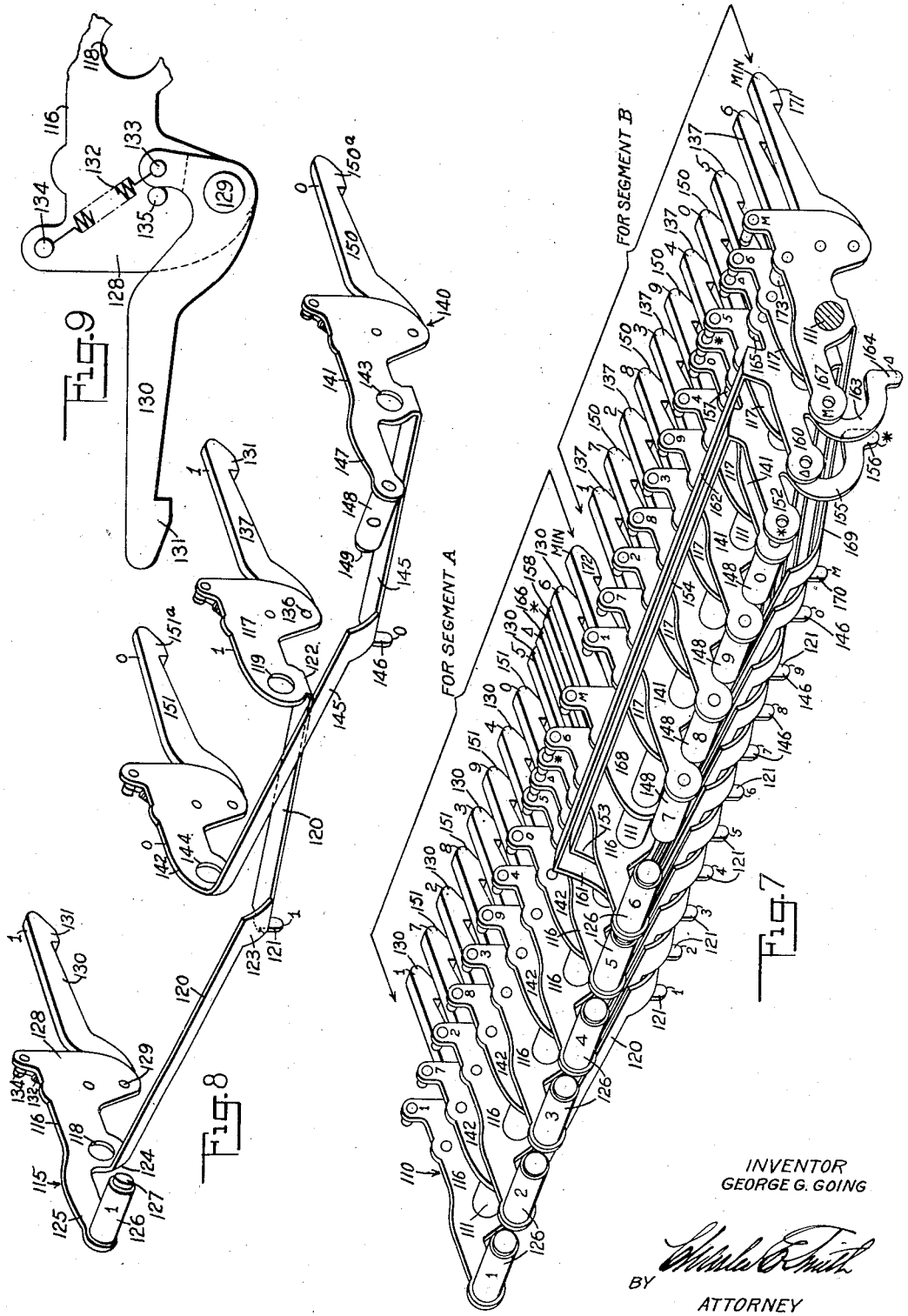

Nov. 29, 1938.    G. G. GOING    2,138,151
TYPEWRITING AND LIKE MACHINE
Filed Dec. 20, 1934    17 Sheets-Sheet 7

WITNESSES
E. G. Bromley
J. H. Beber

INVENTOR
GEORGE G. GOING
BY
ATTORNEY

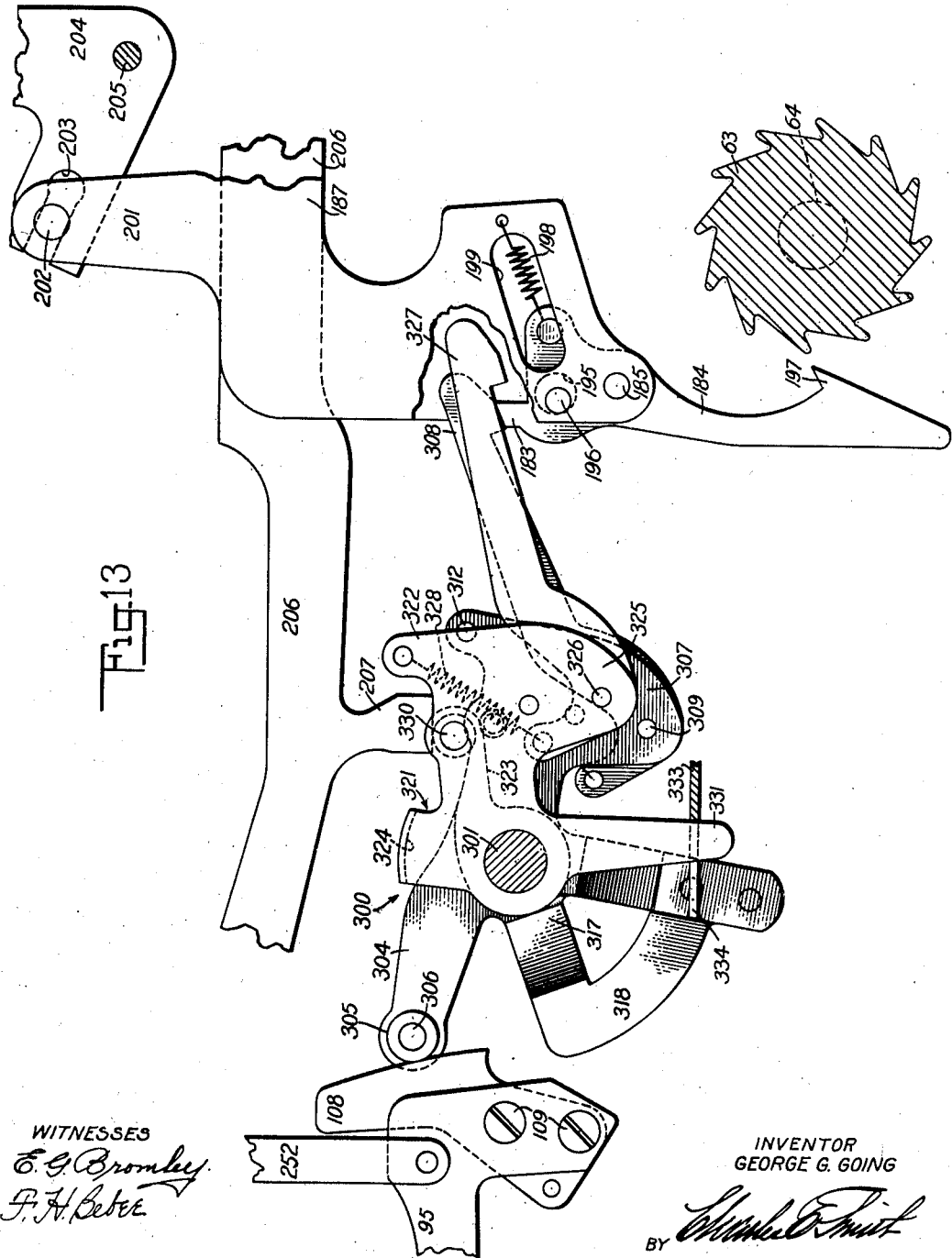

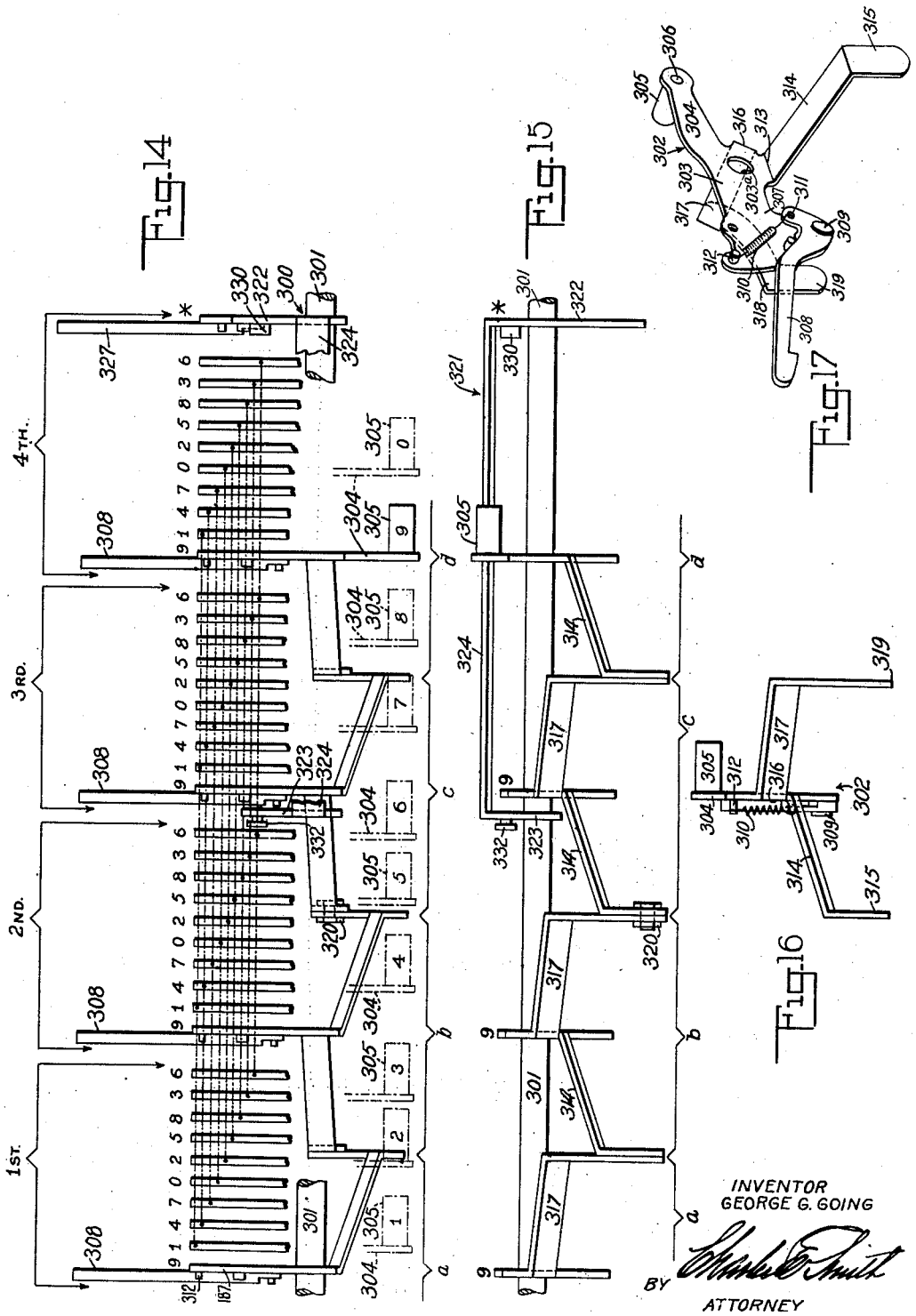

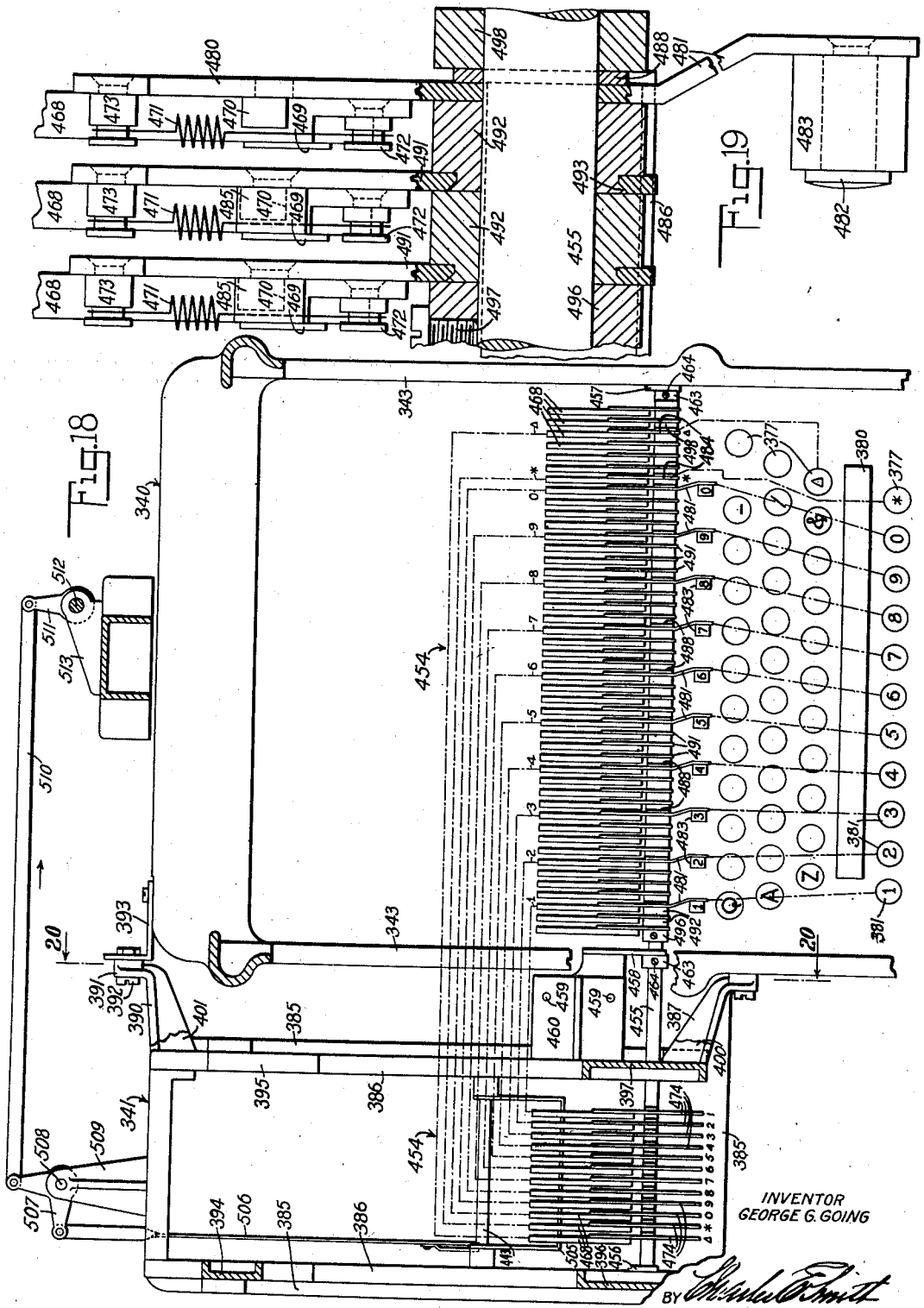

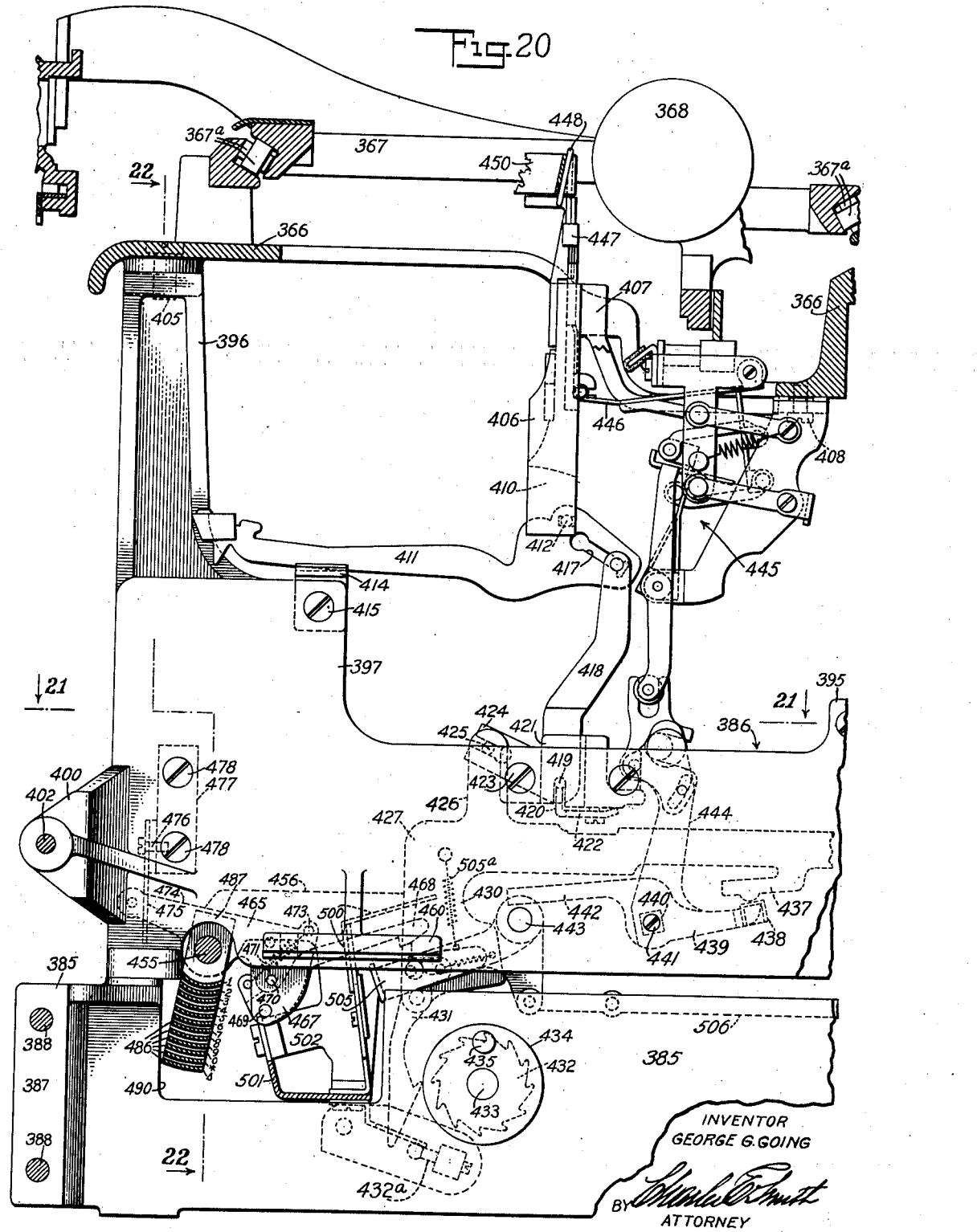

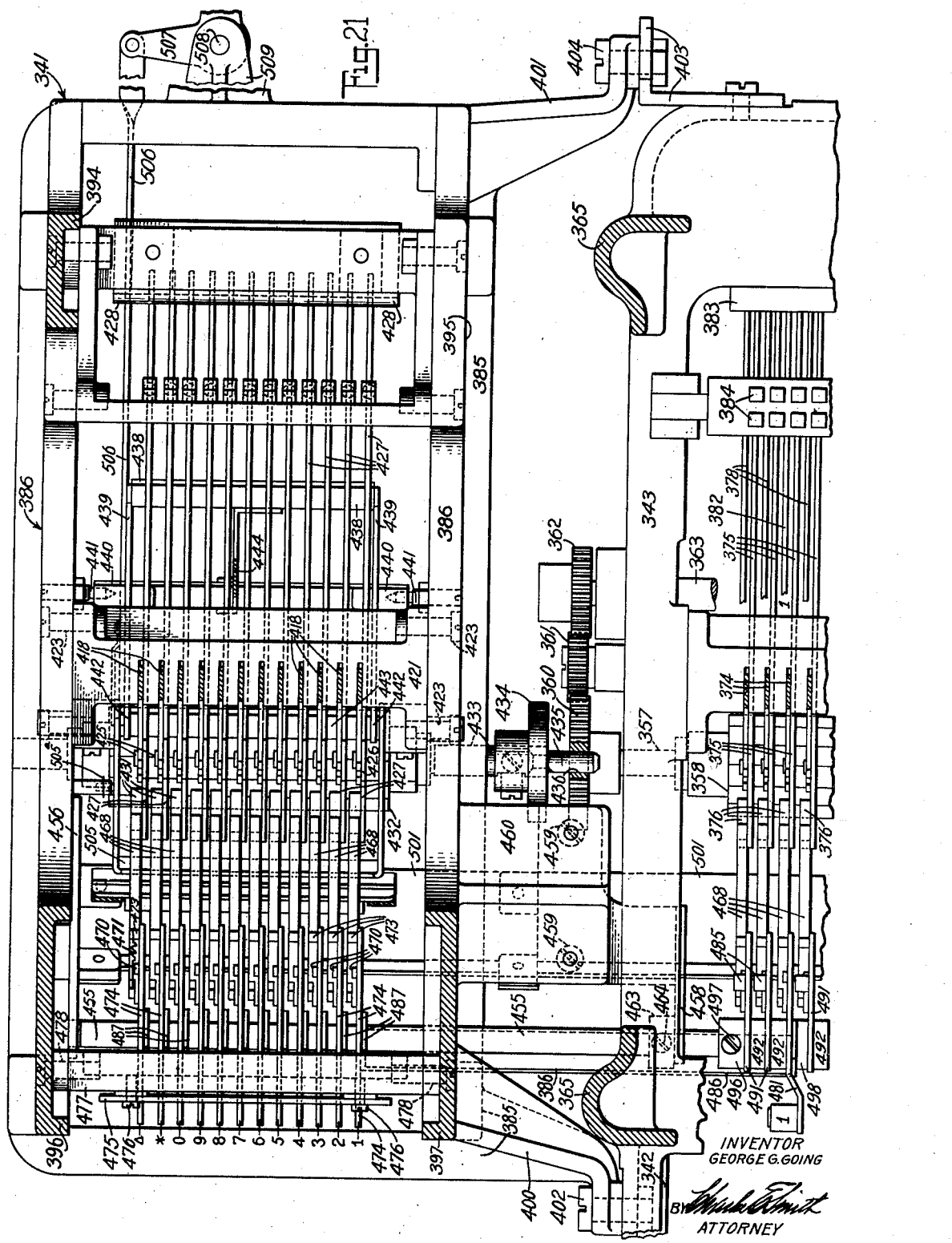

Nov. 29, 1938.　　　　G. G. GOING　　　　2,138,151
TYPEWRITING AND LIKE MACHINE
Filed Dec. 20, 1934　　17 Sheets-Sheet 15

WITNESSES

INVENTOR
GEORGE G. GOING
BY
ATTORNEY

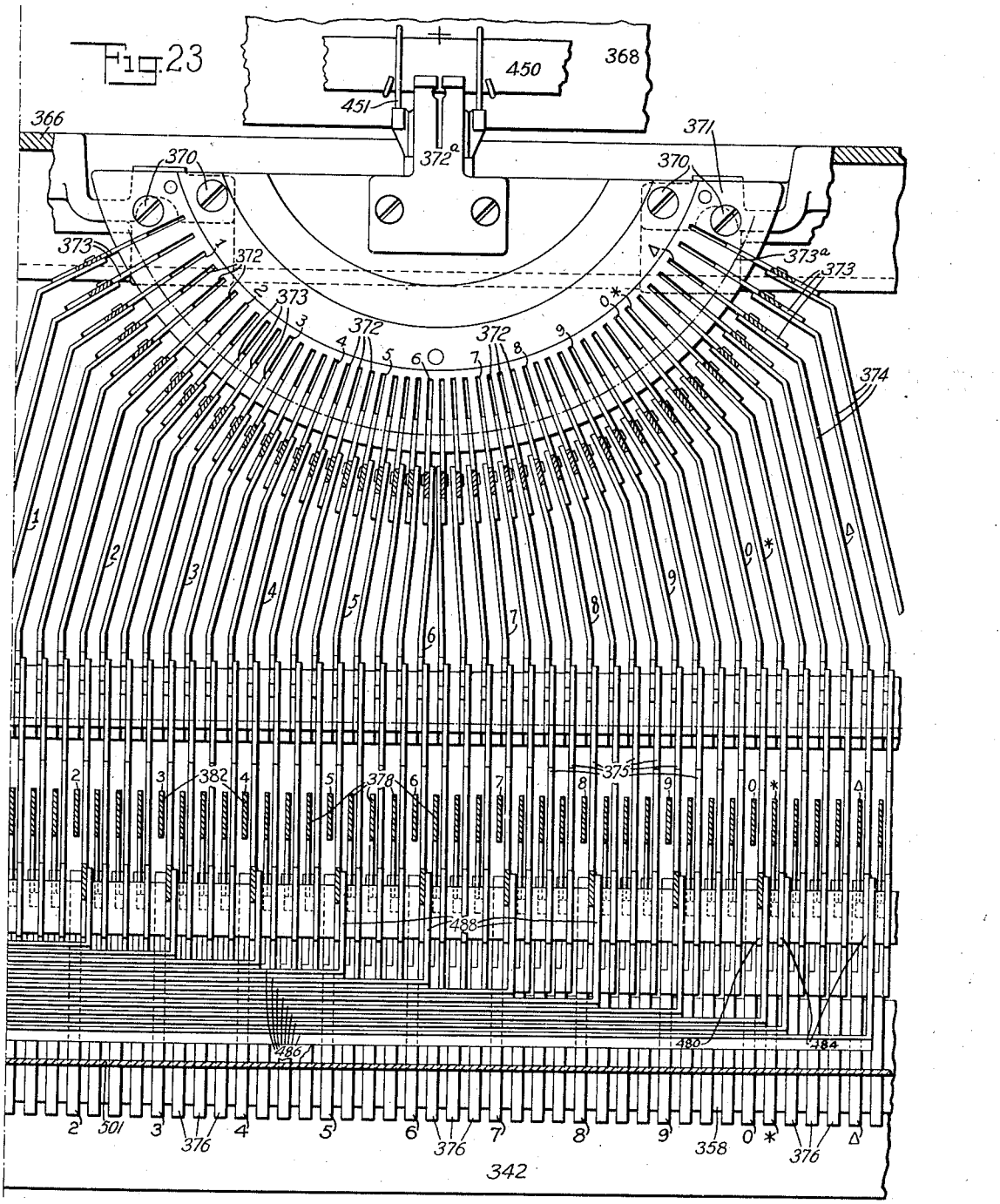

Nov. 29, 1938.   G. G. GOING   2,138,151
TYPEWRITING AND LIKE MACHINE
Filed Dec. 20, 1934   17 Sheets-Sheet 17
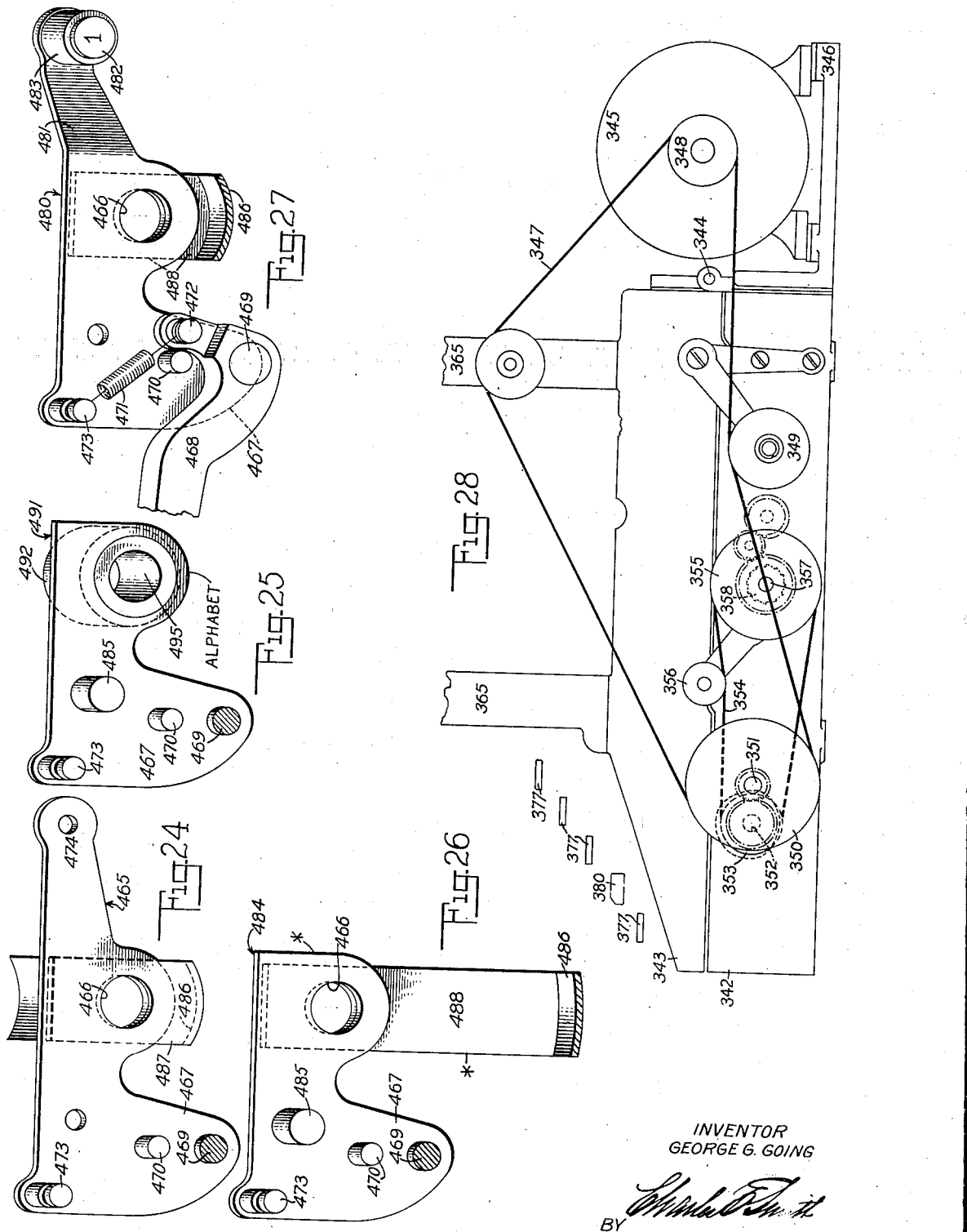
INVENTOR
GEORGE G. GOING
BY
ATTORNEY Patented Nov. 29, 1938

2,138,151

UNITED STATES PATENT OFFICE 2,138,151

TYPEWRITING AND LIKE MACHINE

George G. Going, Utica, N. Y., assignor to Remington Rand, Inc., Buffalo, N. Y., a corporation of Delaware Application December 20, 1934, Serial No. 758,358

25 Claims. (Cl. 197—5)

My invention relates to typewriting, combined typewriting and computing and like machines and more particularly to a typewriting or like machine in which there is a plurality of sets of printing instrumentalities operated by a single set of printing keys.

One of the primary objects of my invention, generally stated, is to provide highly efficient mechanism of the character specified that is durable, reliable in its operation and comparatively simple in its construction.

Another object of my invention is to provide compartively simple and improved means whereby identical entries may be simultaneously printed in a plurality of columns on a work sheet or sheets by the actuation of a single set of printing keys.

A further object of my invention is to provide in a typewriting or like machine of the character specified having a carriage fitted for step-by-step letter spacing movement, a plurality of sets of printing instrumentalities which are power actuated under the control of a single set of printing keys.

Another object of my invention is to provide a plurality of type bar segments and actuating means for the type bars thereof, which may be mounted within the limits of a typewriter frame of the usual construction without materially modifying said frame.

Another object of my invention is to provide means of the above character which may be applied in the nature of an attachment to a standard machine without materially modifying said machine.

A further object of my invention is to provide in a machine having a plurality of sets of printing instrumentalities means for automatically rendering said instrumentalities of certain sets ineffective or inoperative while those of the other set or sets remain effective.

Another object of my invention is to provide a machine of the character last referred to in which the means for rendering the printing instrumentalities effective or ineffective is controlled by the travel of the carriage.

Still another object of my invention is to provide a typewriting machine having a plurality of type bar segments, a separate printing center for the type bars of each segment, and means for silencing the actuation of the type bars of one or more of said segments.

The present invention has for a further object to so construct the control devices for the printing instrumentalities that they will be compact in structure and highly effective in use and may be readily incorporated in existing machines without modifying or materially modifying, the existing structural features of such machine.

To the above and other ends which will hereinafter appear my invention consists in the features of construction, arrangements of parts and combinations of devices set forth in the following description and particularly pointed out in the appended claims.

In the accompanying drawings wherein like reference characters designate corresponding parts in the different views:

Fig. 5 is a fragmentary horizontal sectional view taken substantially along the line 5—5 of Fig. 1 and looking in the direction of the arrows at said line;

Fig. 6 is a fragmentary, transverse, vertical sectional view taken substantially along the line 6—6 of Fig. 1 and looking in the direction of the arrows at said line;

Fig. 7 is a detail perspective view of the control unit showing the controlling pawls, the operating levers and the nested interconnecting bails for said operating levers;

Fig. 8 is a detail perspective view of two of the operating members shown in Fig. 7;

Fig. 9 is a fragmentary, detail, elevational view of a portion of the left-hand face of one of the operating levers and its associated controlling pawl;

Fig. 13 is an enlarged, fragmentary, vertical, fore and aft sectional view through a part of the actuating mechanism employed in a machine having a quadruple segment, and showing the control unit of said actuating mechanism;

Fig. 14 is a fragmentary, diagrammatic, plan view of the control unit for a quadruple segment machine, and showing the complete operating member for the "9" numeral key;

Fig. 15 is a fragmentary, elevational view of the mechanism shown in Fig. 14;

Fig. 16 is an elevational view of one of the complete, basic sections of an operating member in the control unit;

Fig. 17 is a perspective view of the basic section shown in Fig. 16;

Fig. 18 is a horizontal, sectional view, partially diagrammatic, of a machine embodying still another form of my invention;

Fig. 19 is an enlarged, detail view, partly in section, showing how the operating levers of the control unit are mounted on the control unit shaft;

Fig. 20 is a fragmentary, vertical, fore and aft sectional view taken along the line 20—20 of Fig. 18 and looking in the direction of the arrows at said line, the view showing the arrangement of parts in the dual printing unit;

Fig. 21 is a fragmentary, horizontal sectional view taken along the line 21—21 of Fig. 20 and looking in the direction of the arrows at said line;

Fig. 23 is a fragmentary, transverse, sectional view taken along the same line as Fig. 22 and being a continuation of Fig. 22 through the main printing unit of the machine;

Fig. 24 is an enlarged, detail, perspective view of one of the operating levers used in the dual printing unit;

Figs. 25 and 26 are enlarged, detail perspective views of operating levers used within the main unit for an alphabet type bar and one of the clearance proof character type bars respectively;

Figure 1:
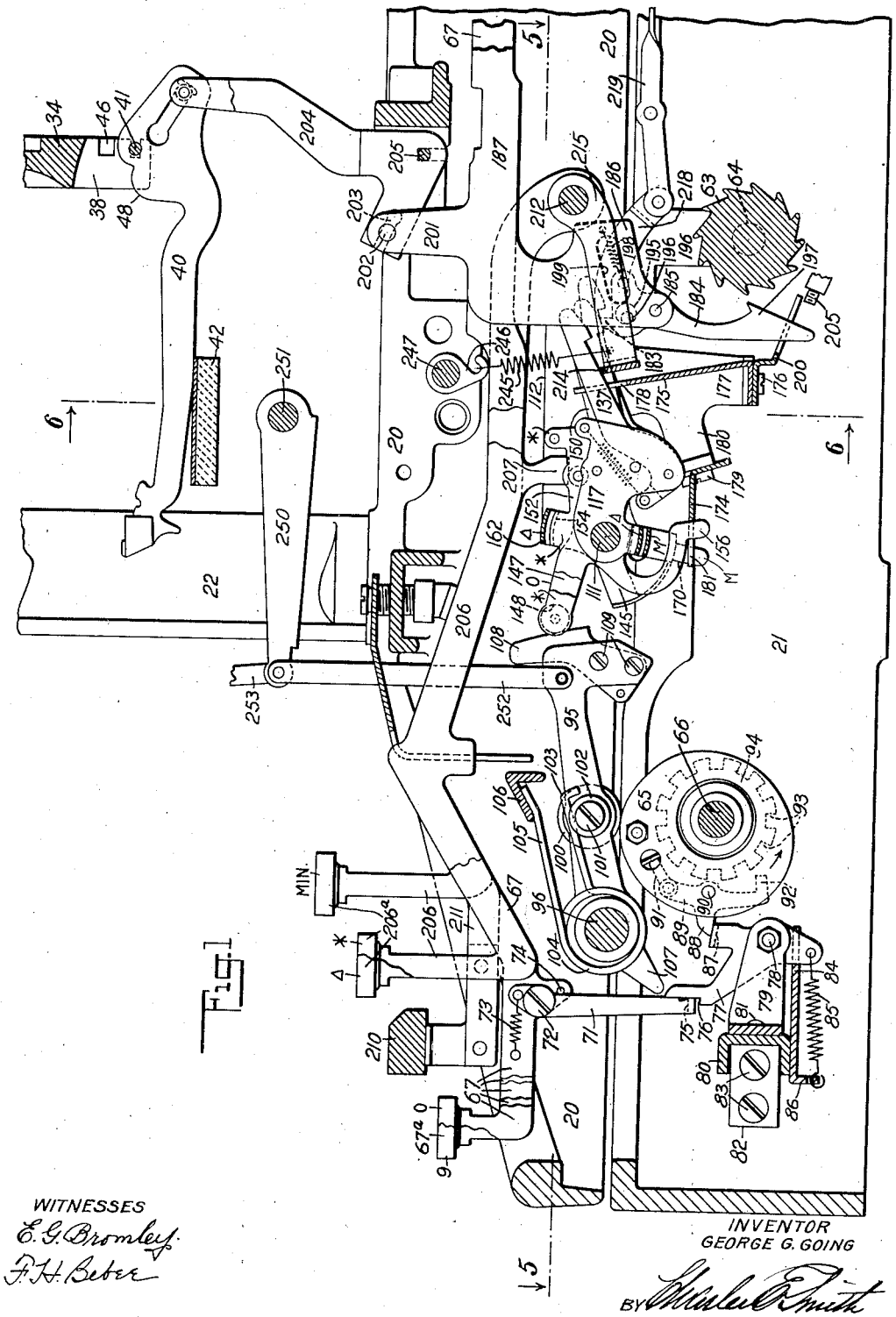
Fig. 1 is a fragmentary, vertical, fore and aft sectional view of the lower front portion of a machine embodying my invention.

Fig. 27 is an enlarged, detail perspective view of one of the numeral type bar operating levers used in the main unit, the view showing the actuating roller for said lever and the manner of attaching a controlling pawl to the lever; and Fig. 28 is a fragmentary, diagrammatic, side elevational view showing the pulley and belt connections from the various driving devices to the electric motor mounted at the rear of the machine.

In the present instance I have shown three forms of my invention. The features of two of these forms have been embodied in a No. 85 Remington electrified bookkeeping machine and within the limits of the frame thereof. Said machine is equipped with computing mechanism similar to that disclosed in the patent to Wahl No. 1,270,471 dated June 25, 1918, the machine being power actuated in a manner as set forth in the application of F. A. Hart Serial No. 510,941 filed January 24, 1931. The third form has been applied to a machine of the above mentioned type in the nature of an attachment. While the devices of my present invention may be incorporated in and embodied within the frame of, or as an attachment to, such a machine without materially modifying the existing structural features thereof, and it is one of the objects of my invention to attain these ends, it should be understood that I am not restricted in the use of the invention to any particular typewriting or combined typewriting and computing machine, but that it may be employed in like machines generally, wherever found available.

In the accompanying drawings I have shown only so much of the frame, computing mechanism and power drive of the No. 85 Remington electrified bookkeeping machine as is necessary to arrive at an understanding of the features of my present invention in their combination therewith. Reference may be made to the above mentioned patent and application for a description of any of the computing mechanism which these drawings do not show and which Remington bookkeeping machines include, or any mechanism which is particularly referred to and not fully illustrated herein.

In various forms of billing and office recording oftentimes it is desirable to type the same item in a plurality of columns either at definite spaced intervals on one sheet or in separate columns on a plurality of sheets. When such columns of amounts are printed on one work sheet, said sheet is usually in a form which may be readily detached into a plurality of sections which in turn are used for different purposes. However, the identical items which appear in different columns may be printed on a plurality of sheets if desired, though the advantage and ease of handling a single sheet will be readily appreciated.

In order that the operator will not have to make a separate entry of the data in each column and thereby consume a considerable amount of time, I provide means whereby an operator may make entries in a plurality of columns by the actuation of a single set of printing keys. Such means comprises a plurality of sets of printing instrumentalities, those of each set having a separate printing point or center, and power actuated means for selectively and simultaneously operating the printing instrumentalities of each set, all of said mechanism being mounted in a suitable frame structure which is provided with a carriage fitted for step-by-step letter spacing movement.

In the present instance, I have shown several forms of construction embodying my invention. These various forms of construction include one in which two sets of printing instrumentalities are mounted within the usual typewriter frame; another in which four sets of printing instrumentalities are mounted within the usual typewriter frame; and another in which there are two sets of printing instrumentalities, but one is provided in the nature of an attachment at the side of an ordinary typewriting machine, for example a Remington electrified bookkeeping machine, which has been slightly modified as will hereinafter appear.

DUAL SEGMENT MACHINE

I shall first describe the form of construction embodying my invention in which there are two sets of printing instrumentalities mounted in the usual frame structure of an ordinary power actuated bookkeeping machine.

For making out certain classes of bills the use of numeral printing types and certain special types of a character to be described alone are required, other data which requires the use of the alphabet types being taken care of by the printed forms or other means. So therefore, in the present embodiment of my invention about to be described, I employ only numeral printing instrumentalities and certain special mark printing instrumentalities, although of course this may be varied at will.

Figure 2:
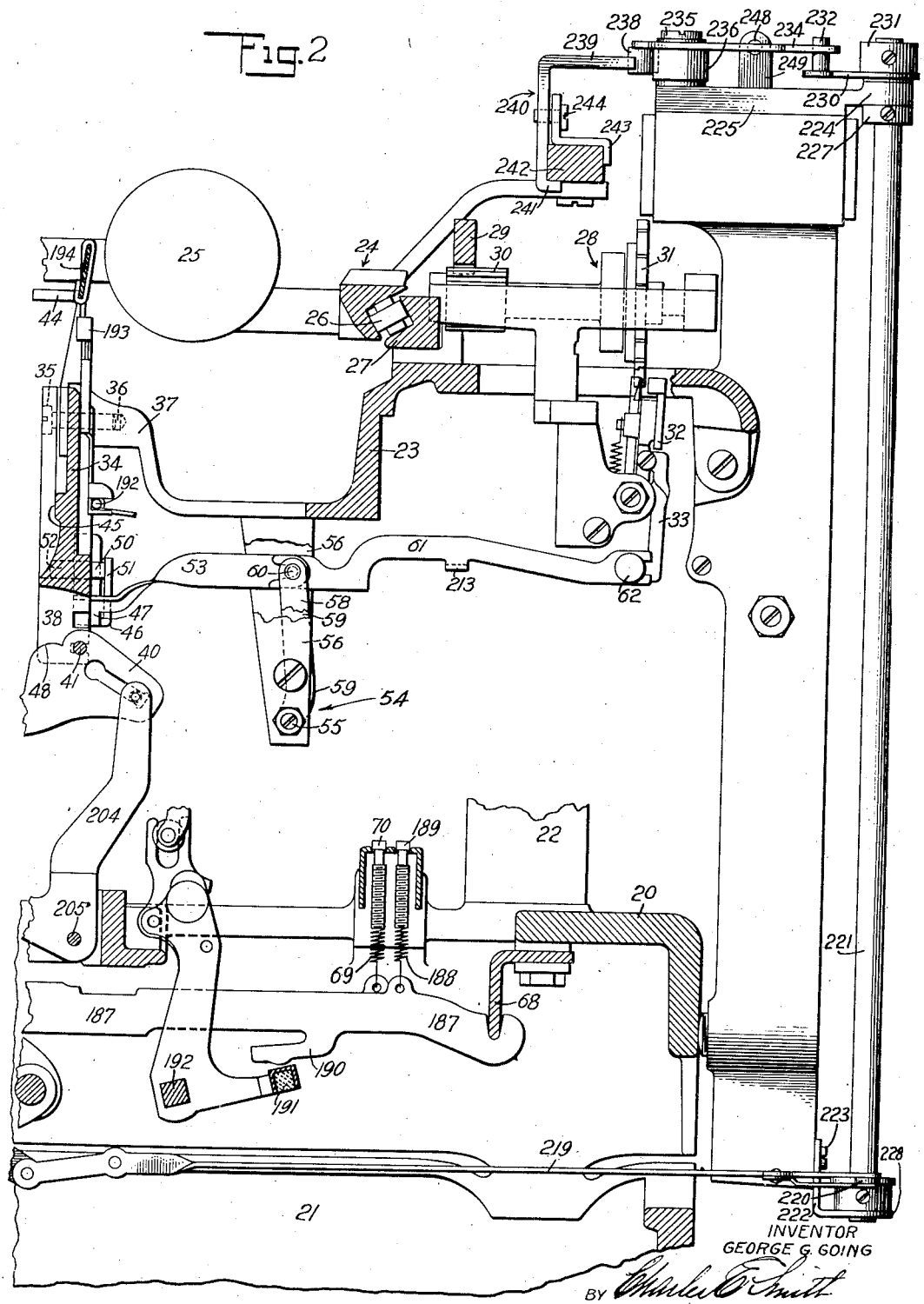
Fig. 2 is a fragmentary, vertical, fore and aft sectional view of the rear portion of the machine taken substantially along the line 2—2 of Fig. 6 and looking in the direction of the arrows at said line.

In the machine as shown in Figs. 1 and 2, the mechanism is preferably included in two units in one of which the parts are carried by a frame designated as a whole by the reference numeral 20, that is much the same as the frame of the No. 85 Remington electrified bookkeeping machine, whereas the parts of the other unit are carried by a second frame 21 that constitutes a base on which the frame 20 rests and to which it is pivotally united by any suitable means. The coacting working parts carried by the frames 20 and 21 are so related that the upper frame 20 may be swung on the base 21 and maintained in an upward open position, in order to give access to the parts contained within the frame 20 at the lower portion thereof, and also to give access to the underlying parts contained within the base frame 21. When the frame 20 is lowered on the base frame 21 and secured thereto, the coacting parts on the two frames will be brought into cooperative relation ready to function in a manner that will hereinafter be more fully described.

The upper frame 20, comprising corner posts 22 and top plate 23, supports a carriage 24 which is of the usual construction and carries a platen 25. The carriage 24 is mounted in the usual manner on roller bearings 26 to travel over the top plate 23 of the machine from side to side thereof, the bearing rollers being supported in the grooved ways in fixed guide rails 27 secured to the top plate of the machine. Said carriage is spring impelled in the direction of its feed by the usual spring drum (not shown) under control of the usual escapement mechanism (Fig. 2) which is designated as a whole by the reference numeral 28 and comprises the usual feed rack 29, pinion 30, escapement wheel 31 and dog rocker 32 having a depending arm 33. A step-by-step letter space advance of the carriage is effected in the usual manner during the operation of the type bars as will presently appear.

Referring particularly to Figs. 2 and 6, it will be seen that a special casting 34, which will hereinafter be referred to as the dual segment, replaces the ordinary type bar segment and is mounted in the machine by means of screws 35 engaging in tapped openings 36 provided in the usual lugs 37 on the top plate 23. The lugs 37 are the same as those provided in the usual machine frame for the mounting of the regular type bar segment. This dual segment casting 34 comprises a left-hand segment or segmental portion A and a right-hand segment or segmental portion B. Each of these segments A and B is radially slotted at 38 to receive and guide a set of printing instrumentalities or type bars 40, the type bars of each segment being pivoted on a separate fulcrum or pivot wire 41. When the type bars 40 are at rest they occupy a substantially horizontal position upon a rest 42 (Fig. 1) and the construction is such that the type bars in segment A may be moved in radial planes upward and rearward from their normal resting position and through one of the usual type guides 43 to strike at a common printing center $P^a$ on the front portion of the platen 25. Likewise the type bars of segment B may be swung upward and rearward through a second type guide 44 to strike the platen at a common printing center $P^b$ which is separate and distinct from the printing center for the type bars of segment A. As shown in Fig. 5 6 the printing points are at equal distances on either side of the center line of the machine.

In the present instance the segmental portions A and B each corresponds to some portion of one of the usual type bar segments for a full complement of printing instrumentalities. That is, each radial slot 38 occupies a position corresponding to that of some particular slot of a regular segment so that regular type bars, bell cranks, sub-levers, key levers etc. may be used to carry out my invention. The segmental portions are similar to a regular segment further in that each is provided with an arcuate anvil 45 on the forward side of the casting and an arcuate groove 46 on the rearward side for the receptiton of a curved universal bar 47. The arcuate grooves 46 are near the lower edges of the segments A and B and cross the slots 38 so that the usual curved heel portion 48 of each type bar will project through its slot 38 and into the groove 46 when the type bar is swung up to the platen.

For the reasons which will hereinafter appear, it is desirable in the present instance, to provide a universal bar 47 in the groove 46 of segment A only. This universal bar is contacted in a well known manner by the heels 48 of the type bars of segment A as they swing to printing position, and such contact causes said bar to move rearwardly. A pin 50 is attached to an ear 51 provided on the universal bar 47 at a central portion thereof, and said pin registers with a circular opening 52 in the segment casting to guide said bar 47 in its rearward movement. The movement of the universal bar 47 is transmitted by a pair of arms 53 to a pivoted frame, designated as a whole by the reference numeral 54. This frame is the same as those used in regular machines and is pivotally supported at its ends by means of pointed screws 55 on a pair of brackets 56, which extend downward from the top plate 23. The frame 54 is used to transmit the motion of the universal bar to the dog rocker 32 and comprises three upwardly extending slotted arms 57, 58 and 59, the first two of which have the arms 53 of the universal bar pivotally connected thereto as by means of a screw or pin 60. A link 61 completes the train of connections to the depending arm 33 of the dog rocker 32, said link being bifurcated at its forward end and straddling the pin 60 of the arm 58 and also bifurcated at its rearward end and engaging a headed pin 62 on the depending arm 33 of the dog rocker.

Thus it will be seen that when one of the type bars in segment A is swung to printing position it will effect a rearward movement of the link 61 through the movement of the universal bar 47. This motion is transmitted to the dog rocker 32 to effect a letter space movement of the carriage. When the type bar is returned to its resting position the universal bar will likewise be moved back into the groove 46 by means of the usual returning spring mechanism (not shown) employed in conjunction with the pivoted frame 54.

In the present instance, the left-hand segmental portion A is provided with a set of thirteen of the printing instrumentalities or type bars 40. This set includes ten numeral type bars for the numerals "0" to "9" and three special character type bars, "★", "△" (for proof of clearance signals) and "Min." The use of the clearance proof characters, which will be hereinafter referred to as "star" and "triangle", is well known in combined typewriting and computing machines, either of said signals when printed indicating that the particular cross totalizer is clear or at zero, and thus the entries have been made correctly. In combined typewriting and computing machines, the number of clearance proof characters used depends on the number of cross totalizers employed. That is, if there is only one cross totalizer the usual character is the "star", whereas, if the machine is equipped for two cross totalizers, as in the present construction, the "star" is controlled by one of said cross totalizers, while the "triangle" when printed indicates a clear condition in the other. The signal "Min." is an abbreviation of the word "minimum" and is used in certain forms of billing, such as that used by public utilities, and when printed after an amount indicates that said amount is the minimum amount charged and therefore does not have to be checked by the checkers or supervisors.

As shown in Fig. 6 and designated at the bottom of the sheet below a part of the actuating mechanism for each type bar, the type bars of segment A are arranged in the following order, reading from left to right: "1", "7", "2", "8", "3", "9", "4", "0", "5", "triangle", "star", "6" and "Min." The right-hand segmental portion B is provided with eleven type bars, which are for the same characters as segment A except that the "star" and "triangle" are omitted. The type bars in segment B are arranged in the same order as in segment A with the above mentioned "star" and "triangle" type bars omitted. This arrangement is all clearly depicted in Fig. 6.

It is to be understood that the selection of the special character keys is arbitrary and may vary for any particular type of work the machine is set up for. Although in the present instance I have shown the left-hand segmental portion A with two additional special character keys, it is to be understood that, if desired, both segments could have the same number. In the present set-up, it is assumed that the clearance proof signals are only to be printed in the column or columns of the work sheet or portion of a sheet which is printed by the type bars of the left-hand segment.

*Driving mechanism and control unit*

In the machine as shown various driving devices for the computing mechanism and type bars are employed which are driven by a constantly running electric motor detachably secured to the frame 21 at the rear thereof as shown, for example in Fig. 28. Referring to Fig. 1 it will be seen that the driving devices in question include the usual tooth-bearing actuating roller or snatch roll 63 fixedly mounted to turn with a motor driven shaft 64, and a series of independently operable controlling cams 65 loosely mounted on, but adapted to be selectively coupled with a motor driven shaft 66, as will hereinafter more clearly appear.

The shafts 64 and 66 are preferably mounted on ball bearings, and at the right-hand side of the machine said shafts extend beyond the frame 21 where they are provided with driving pulleys. These pulleys are then connected in a well known manner to the motor by means of driving belts, so that the shafts operate in unison but at the proper ratio. The arrangement of the pulleys and driving belts is similar to that shown in Fig. 28 for another form of my invention.

In previous Remington electrified bookkeeping machines, for example those of the type shown in the Hart application Serial No. 510,941 above referred to, it has been customary to operate the numeral keys and computing mechanism from the controlling cams 65, and the alphabet type bars from the snatch roll 63. In accordance with my present invention, however, due to the fact that the type bars of both segments A and B are to be operated in unison, it has been found advantageous to operate them in a slightly different manner, though in many respects the actual operating mechanism is the same.

As mentioned above there are two different types of type bars, the numeral type bars and the special character type bars. Both the numeral and special character type bars are actuated by the snatch roll 63 but in the case of the numeral type bars the actuation is controlled by the cams 65. The reason for this will be apparent since when each numeral key is actuated the amount which any particular key controls is first entered into the computing mechanism under control of the cams 65 and then printed on the work sheet or sheets. I shall first describe the manner of operating the numeral type bars from the cams and snatch roll.

Referring to Figs. 1, 2 and 5 it will be seen that substantially horizontally disposed numeral key levers 67 having keys 67ᵃ extend in fore and aft vertical, parallel planes and are fulcrumed at their rear ends on a common fulcrum bar 68 carried by the frame 20. A contractile returning spring 69 is connected to each of said key levers and is provided with the usual adjusting screw 70. Each key lever 67, near the forward end thereof, is provided with a depending arm 71 pivotally connected to said lever at 72. A spring 73 attached at one end to the depending arm 71 and at the other end to the key lever 67 resiliently holds said arm in a substantially vertical position in contact with a stop pin 74. The lower end of each depending arm 71 is provided with a laterally projecting lug 75 which is adapted to cooperate with a shoulder or engaging portion 76 on the usual trip lever 77. Each lever 77 is pivoted at 78 on a hanger arm 79 secured to a cross bar 80 by screws 81. The bar 80 is provided at its ends with feet 82 by which it is secured with the aid of screws 83 to the base frame 21. The lower end portion of each lever 77 is guided in a slot in a guide comb 84 and is limited in its clockwise movement by coacting with the end wall of its guide slot, as shown in Fig. 1. A contractile spring 85 is connected at one end to each lever 77, and at the opposite end thereof is anchored to a flange 86 provided at the forward edge of the guide comb, said spring 85 resiliently holding the trip lever 77 in its normal position.

When each trip lever 77 is resiliently held in normal position in this manner, as shown in Fig. 1, an upwardly extending arm 87 thereon engages a projection 88 on a locking pawl 89. One of these locking pawls is pivoted at 90 to the side of each of the cams 65 and is urged in a counterclockwise direction (Fig. 1) by a spring pressed push rod 91. The force exerted by each push rod 91 on the locking pawl 89 is great enough so that when the projection 88 thereof is released from the associated arm 87, a square engaging nose 92 on the locking pawl will be forced into one of the interdental spaces 93 of a toothed locking wheel 94. These locking wheels 94 are mounted to turn with the power driven shaft 66 and there is one for each of the cams 65. The construction of all the aforementioned parts associated with the key levers 67 is such that when one of the numeral keys 67ª is depressed the associated trip lever 77 will be turned in a counter-clockwise direction (Fig. 1) to release the locking pawl from engagement with the upstanding arm 87 and lock the cam 65 to turn with the rotating shaft 66 for one revolution.

Having described the manner in which cams 65 are selectively driven from the power shaft 66, I will next describe how motion is transmitted from such cams to the computing mechanism and the type bar control unit, which governs the actuation of the type bars from the snatch roll, as will hereinafter appear.

From an inspection of Figs. 1 and 5 it will be seen that there is provided a series of oscillatory actuating members 95, corresponding to the number of cams 65 employed, of which there are, in the first instance, ten; one for each of the numeral printing type bars "0" to "9" inclusive. Each of the actuating members 95 is in the nature of a lever or arm pivoted to turn loosely on a fixed pivot rod 96 mounted at its ends in brackets secured to the frame 20. The members 95 are maintained spaced apart on the pivot rod by spacing sleeves 97 (Fig. 5) each fixedly attached to the pivot rod by a set screw 98. Each member 95 carries a roller 100 pivotally supported on one side thereof on a pivot pin 101. This pivot pin 101 passes through an opening in the arm 95 and at the opposite end thereof provides a bearing for a second, peripherally grooved roller 102. Each of the members 95 is equipped with such rollers 100 and 102, the former bearing against its associated cam 65, whereas each of the rollers 102 provides a bearing for one end portion 103 of a heavy spring 104. The opposite end portion 105 of each of said springs bears against a cross bar 106 secured at its ends to the frame 20. The portion of each spring 104 intermediate its ends is coiled around the companion spacing sleeve 97 on the pivot rod 96, as clearly indicated in Fig. 5.

The force of each of these springs is exerted downwardly on the companion member 95, the movement of such member under the force supplied by its spring being resisted by the associated cam 65. The power of each spring is sufficient to actuate the computing mechanism but this spring is not required to actuate the companion lever in the control unit which is to be hereinafter described. This lever is positively actuated by the companion cam 65 in returning the associated arm 95 to normal position against the force of its spring 104, as will presently more clearly appear.

Each member 95 extends forward of the pivot rod 96 on which it is mounted to provide a holding or tripping arm 107 that is adapted to cooperate with the companion depending arm 71. The purpose of this cooperation between the holding arm 107 and its companion arm 71 is to hold the latter, in its return movement out of cooperative relation with its trip lever 77, until the companion cam 65 has about completed its cycle. Thus, as the released cam 65 starts to turn and the low portion is approached, the arm 107 will move into cooperation with, and prevent a rearward movement of the companion arm 71, and will remain in an obstructing position substantially until the cam has completed its revolution and the arm 107 has been returned to normal position. This insures a kicking and holding off of the arm 71 from its trip lever 77 and thus enables the latter to be immediately returned to a position where it will coact with, and release, the locking pawl 89 as the latter is carried around with the companion cam.

Referring particularly to Fig. 1, it will be observed that each member 95 at its free rear end has an enlarged portion to which a cam or tripping member 108 is secured by any suitable means such as the screws 109. These cams cooperate with the forwardly extending arms on the operating levers of the control unit, said control unit being provided with means for effecting a tripping of the usual snatch pawls and the consequent printing movement of the type bar. I shall now describe this control unit which constitutes a connecting means for effecting a simultaneous operation of a plurality of numeral type bars upon the actuation of a single numeral key.

As shown in Figs. 5, 7 and 8 the control unit, which will be designated as a whole by the reference numeral 110, comprises a group of nested operating or controlling members mounted on a shaft or pivot rod 111. The pivot rod 111 is fixedly secured in any suitable manner in brackets 112 which are bolted to the sides of the upper frame section 20 through studs 113. A pair of locking collars 114 secures the pivot rod 111 against lateral displacement with respect to the brackets 112. The operating members mounted on the pivot rod 111, are, in the present instance, of three separate and distinct types. One type is controlled by the numeral keys for the "1", "2", "3", "4", "5", and "6" type bars; the second type is controlled by the numeral keys for the "7", "8", "9" and "0" type bars; and the third is controlled by the special character keys for the clearance proof "star" and "triangle". In the present instance, there is a third special character key, the "Min." key, which has an operating member somewhat similar to those used with the "7", "8", "9" and "0" keys as will hereinafter appear. I shall now describe these different operating members.

Since the operating members for the "1", "2", "3", "4", "5" and "6" numeral keys are identical in construction, I shall only describe in detail the member which is controlled by the "1" key. As shown in perspective in Fig. 8 this member, which is designated as a whole by the numeral 115, comprises a left-hand operating or control lever 116, controlling the type bar for the numeral "1" in the left-hand segment, and a right-hand operating or control lever 117 which controls the type bar for the numeral "1" in the right-hand segment B. These two levers 116 and 117 are each mounted on the pivot rod 111 which passes through an opening 118 in the lever 116 and an opening 119 in the lever 117. A bail 120 provided at its central portion with a downwardly extending projection 121 constitutes an interconnecting means or actuating bail so that the two levers 116 and 117 may be operated in unison. The bail 120 may be secured to the lever 117, or formed integral therewith, at a point 122 directly below the opening 119. Said bail extends leftward and downward from this point of attachment 122 as far as the projection 121 where it is curved and bent upwardly as at 123. The curved section 123 is comparatively short and the bail extends thence to the left in a different plane to the lever 116. The bail may be attached to, or formed integral with said lever 116 at a point 124 which is forward of the opening 118. Extending forward from the lever 116 at a point above the opening 118 is an arm 125 which is provided at its end with a roller 126 and is secured on the right-hand side thereof by means of a pin or stud 127. It is this roller 126 which coacts with the cam 108 provided on the arm 95 associated with the numeral "1" key lever in a manner which will hereinafter appear.

The rearward end of the lever 116 has an enlarged portion 128 upon which is pivoted on the left-hand side thereof at 129 a controlling pawl or snatch pawl latch 130. This controlling pawl 130 is provided at its rearward end with a latching or engaging portion 131 and, as shown in Fig. 9, is given a tendency to turn in a counterclockwise direction as viewed in Fig. 9 or clockwise as viewed in Fig. 8 about the pivot 129 by means of a spring 132 which is attached at one end to a pin 133 provided on the forward end of the controlling pawl and attached at its other end to a pin 134 on the lever 116. The construction of the controlling pawl is such that a stop pin 135 on the lever 116 limits the movement of said controlling pawl in either direction about its pivot 129.

The lever 117 has pivoted to its left-hand face at 136 a controlling pawl 137 which is similar in all its details of construction, and in its manner of attachment, to the controlling pawl 130 described above. In fact, the only structural difference between the levers 116 and 117 is in the forward portions thereof as hereinbefore described.

The operating members for the "7", "8", "9", "0" and "Min." keys are all substantially alike in construction and comprise the same major elements as the operating members above described, but the forward arms and rollers are mounted in reverse relation. Since these control members are alike in their construction I shall only describe in detail the member used for the "0" key.

Referring again to Fig. 8, it will be observed that the operating member for the "0" key, which is designated as a whole by the reference numeral 140, comprises a right-hand operating lever 141 and a left-hand operating lever 142 which are mounted on the pivot rod 111 by means of the openings 143 and 144 respectively. These two operating levers are interconnected by means of a bail 145 having a downwardly extending projection 146 at the central portion thereof. Extending forwardly from the operating lever 141 is an arm 147 which has a roller 148 secured on the left-hand face thereof by means of the pin or stud 149. Controlling pawls 150 and 151, identical with the pawls 137 and 130 and having hook-like engaging or latching portions 150ᵃ and 151ᵃ respectively, are pivoted to the left-hand face of the operating levers 141 and 142 respectively.

Figure 10:
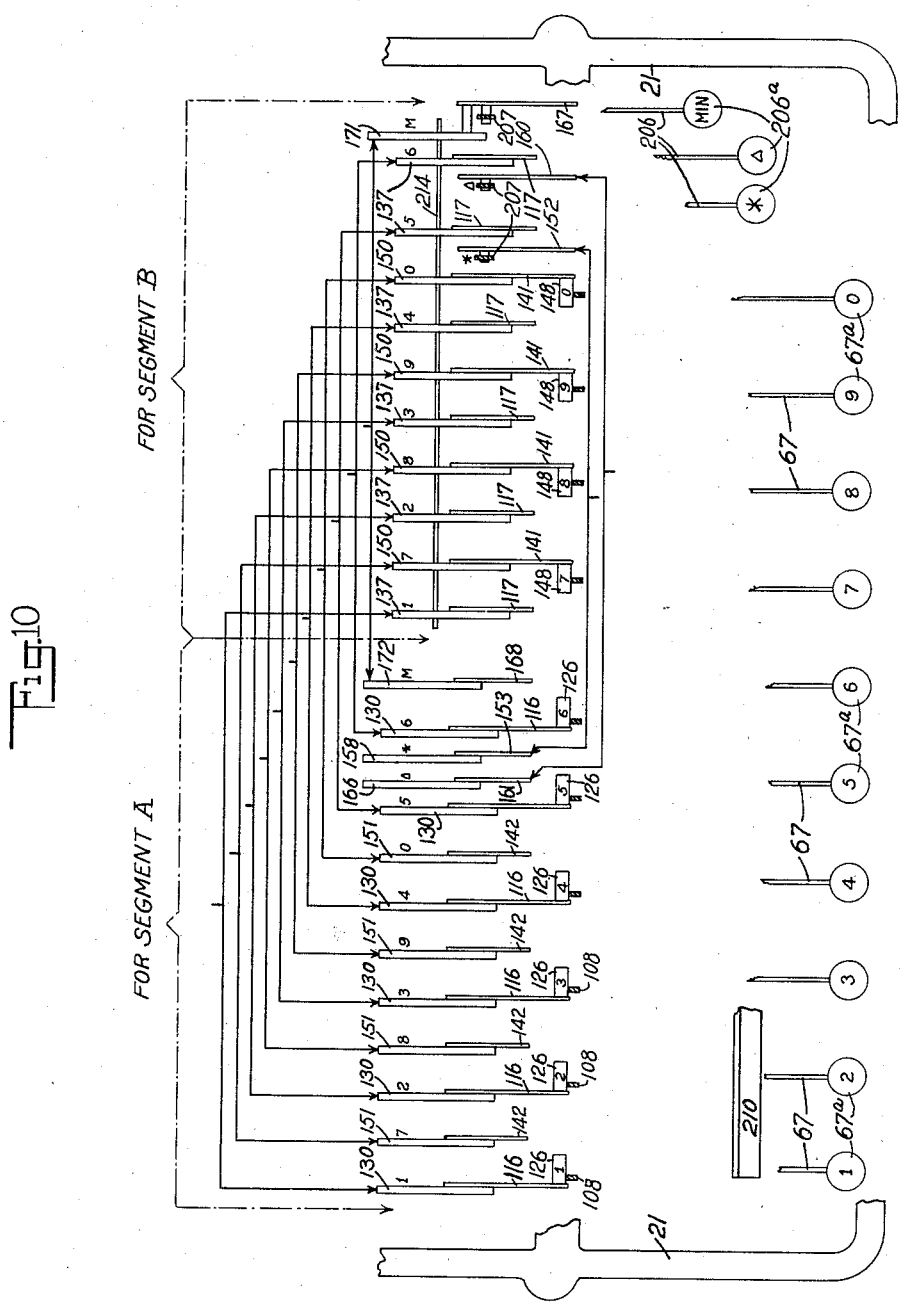
Fig. 10 is a fragmentary, diagrammatic plan view of the control unit and the keyboard.

From an inspection of Fig. 8 it will be seen that the operating member 140 is substantially the same in its construction as the operating member 115. In fact, the only difference in their construction is that the forwardly extending arm 147 is applied to the right-hand operating lever, and the roller 148 thereon extends to the left, whereas in the operating member 115 the forwardly extending arm is applied to the left-hand lever and its roller extends to the right. However, in the case of both of these operating members the controlling pawls 130 and 151 attached on the left-hand faces of the left-hand operating levers are used to control the actuation of the type bars in the left-hand segment A, and the controlling pawls 137 and 150 attached to the left-hand faces of the right-hand operating levers 117 and 141 are used to control the actuation of the type bars in the right-hand segment B. In the case of the operating members 115 for the "1", "2", "3", "4", "5" and "6" numeral keys, they are controlled by a numeral key which is in the left-hand portion of the keyboard, as shown in Fig. 10, and hence the roller 126 is attached or secured to the left-hand operating lever. However, in the case of the operating levers 140 for the "7", "8", "9", and "0" numeral keys, these are controlled by a numeral key in the right-hand portion of the keyboard and hence the rollers 148 are pivoted to an arm on the right-hand operating lever 141. Fig. 10 illustrates the relation of the keys in the keyboard to their associated operating levers in the control unit.

As explained above, the type bars for the special characters and clearance proof signals are not controlled by the cams 65 and hence the construction of their operating members is somewhat different than the operating members for the numeral keys or type bars. However, the operating members for all the special character keys, including the "Min." key, might be said to be modified forms of the operating members 140, since they are controlled by keys in the right-hand portion of the keyboard.

Referring particularly to Fig. 7, it will be seen that the operating member for the "star" key comprises a right-hand operating lever 152 similar to the lever 141, and a left-hand operating lever 153 similar to the lever 142. These levers are mounted on the pivot rod 111 and are interconnected by a bail 154 which is secured to the top, rather than the under side, of the two operating levers. Forward of the pivot rod 111 and extending downward from the lever 152 is an arm 155 which is curved so that it may clear the interconnecting bails of the numeral key operating members and is provided with a projection 156 similar to the projections 121 and 146 previously described. On the left-hand face of the lever 152 and rearward of the pivot rod 111 there is provided a pin 157 by means of which the operating member for the "star" key receives its movement directly from the key lever as will hereinafter more clearly appear. Since it is desired to print the clearance proof signals only in the left-hand work sheet or portion of a sheet, and the type bars for these signals are only provided in the left-hand segment A, the operating lever 152 is not provided with a controlling pawl but the lever 153 has pivoted to its left-hand face a controlling pawl 158 which is identical with the pawls 130 and 151.

The operating member for the other clearance proof signal, the "triangle", comprises a right-hand operating lever 160 and a left-hand operating lever 161, similar to the levers 152 and 153 respectively. Both these levers 160, 161 are mounted on the pivot rod 111 and are interconnected by a bail 162 which, as shown in Fig. 6, occupies a plane higher than the bail 154 in order that it may clear said bail when in operation. Due to the positions of the levers 160 and 161 on the pivot rod 111 the bail 162 is also longer than the bail 154. Forward of the pivot rod 111 and extending downwardly from the lever 160 is a curved arm 163 having a projection 164 similar to the arm 155 and projection 156 respectively. The operating member for the "triangle" key is also provided with a pin 165 like the pin 157 by which said operating member is actuated, and the left-hand lever 161 is provided with a controlling pawl 166 which controls the actuation of the "triangle" type bar.

The operating member for the other special character keys, in the present instance only the one "Min." key, comprises a right-hand operating lever 167 and a left-hand operating lever 168, said levers being mounted on the pivot rod 111 and interconnected by a bail 169 having a central downwardly extending projection 170. This operating member is similar in its entire construction to the operating members 140, and is provided with right and left-hand controlling pawls 171 and 172 pivoted to the levers 167 and 168 respectively. However, the lever 167 does not have a roller like the roller 148 but instead is provided with a pin 173 by which it is actuated.

It is to be understood that the enlarged forwardly extending portions of each of the different types of operating levers are all alike in their construction; and the controlling pawls pivoted to the left-hand faces thereof are also duplicates of one another.

All of the above described operating members for both the numeral and special character keys are mounted on the fixed pivot rod 111 in such a manner that the controlling pawls thereof for the left and right-hand type bar segments will occupy positions corresponding to the positions of their associated type bars. As shown in Fig. 7 these controlling pawls occupy the following order reading from left to right: "1", "7", "2", "8", "3", "9", "4", "0", "5", "triangle", "star", "6", "Min." "1", "7", "2", "8", "3", "9", "4", "0", "5", "6", "Min.". This arrangement is also shown in Figs. 6 and 10 where, in Fig. 6, the operating members and the mechanism associated therewith which leads directly to the type bars is also illustrated. When all the operating members are mounted in this manner on the pivot rod 111 the interconnecting or actuating bails thereof will occupy an internested relation as depicted in Fig. 7, thereby providing a compact and comparatively simple construction.

In order to maintain all the operating members in their proper spaced positions relative to one another, and to keep them from becoming interlocked in any manner during operation, two separating and guiding combs 174 and 175 are provided. As shown in Figs. 1 and 5 the comb 175 is secured by means of screws 176 to downwardly extending arms 177 provided on the brackets 112. Slots 178 in the upper edge of the comb 175 hold the controlling pawls in the positions in which they are shown in Fig. 7 and guide said pawls in their operating movements. The comb 174 is secured by means of screws 179 to forwardly extending projections 180 on the arms 177. This comb 174 occupies a substantially horizontal position and is provided with slots 181 at properly spaced intervals with which the projections 121, 146, 170, 156, and 164 engage. These slots guide the operating levers in their partial rotary movement about the pivot rod 111, such movement in a counter-clockwise direction (Fig. 1), being limited by contact of the projection with the rearward end of the slot.

From an inspection of Fig. 5, it will be apparent that the entire control unit made up of the operating levers, controlling pawls, interconnecting bails, and the two above described guide combs may be removed from the machine as one piece of mechanism by removing the screws in the studs 113. Thus, by raising the upper frame section 20 from the base or lower frame section 21 in the usual manner the control unit may be removed from the machine for purposes of repair or replacement.

Figure 4:
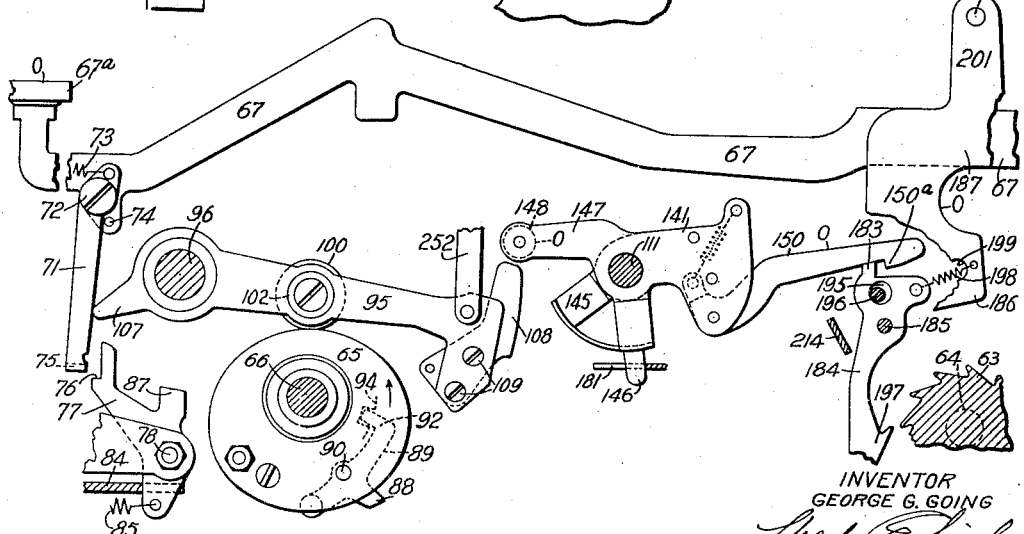
Fig. 4 is a fragmentary, vertical, fore and aft sectional view of part of the mechanism shown in Fig. 1, showing the positions of the parts at the low point of the controlling cam.

As stated above each of the controlling pawls is provided with a hook-like engaging or latching portion, like the latching portion 131 shown in Fig. 8, and each of these hook-like ends coacts with an upwardly extending projection 183 on a companion engaging or actuating pawl 184, shown in Figs. 1 and 4. Each pawl 184 is pivoted at 185 on the depending forward end portion 186 of a substantially horizontally disposed type bar actuating lever 187, said actuating levers being parallel with and interspersed between the key levers 67. There is one lever 187 for each controlling pawl and they are all fulcrumed on the common fulcrum bar 68 in the rear of the machine, each lever 187 being connected to a returning spring 188 having an adjusting screw 189, as indicated in Fig. 2.

Upon reference to Fig. 2 it will be observed that each of the levers 187 is provided with a depending projection 190. It will be understood that each projection 190 coacts with a universal bar 191 functioning in the usual manner in conjunction with a ribbon vibrating mechanism of the type shown in the patent to Barr No. 1,153,668 to interpose the ribbon in the path of the type bars as the latter approach the printing position. The ribbon vibrating mechanism is connected to a supporting rod 192, shown in Figs. 2 and 6, which carries at either end one of the usual ribbon carrying slides 193. One of these ribbon carrying slides engages each of the type guides 43 and 44, and a single printing ribbon 194 passes through the holding wires thereof to be placed simultaneously over the printing points for segments A and B each time a key lever is operated. Since this ribbon vibrating mechanism itself may be of any suitable type, it has not been shown in the present embodiment of my invention, but is illustrated in Fig. 20 in conjunction with a modified form of my invention.

As shown in Figs. 1 and 4, each engaging pawl 184 is provided with stop devices of the usual construction. Thus, each pawl has an enlarged opening 195 therein for the reception of a stop pin 196 carried by the companion parts 186 of the lever 187 to which said pawl is pivoted. These stops limit the movement of the hook-like lower end 197 of the pawls away from the teeth of the snatch roll 63 under the force of the contractile springs 198. Each of said springs 198 is connected at one end to a pawl 184 and passes through an opening 199 to the opposite side of the companion part 186 where the other end of the spring is secured.

The lower end portion of each engaging pawl 184 is guided in a guide slot of a guide comb 200 secured at its ends to the depending arm 177 by the screws 176.

Each of the levers 187 is provided with an upwardly extending projection 201 that carries a pin 202. Said pin operates in the usual manner in a slot 203 of a sub-lever or bell crank 204, pivoted at 205 and operatively connected at its upper end in the usual manner with one of the numeral printing type bars 40. So much of the type actions as includes the sub-levers 204, the type bars, the carriage construction, the carriage feed mechanism, etc. are, or may be of the usual construction employed in standard Remington machines.

Having thus described the train of operating mechanism between the numeral keys 67a and their associated type bars 40, I shall now describe the operation of this mechanism.

*Operation of dual segment machine*

The effect of depressing any one of the numeral keys, for example the numeral key for the "0" type bars, is to cause its associated depending arm 71 to turn the trip lever 77 in a counterclockwise direction against the tension of the spring 85. Such movement of the trip lever 77 allows the projection 88 on the locking pawl 89 to become freed from the shoulder 87 and hence lock the cam 65 for the "0" key lever to its companion locking wheel 94 by engagement of the nose 92 with one of the interdental spaces 93 on said locking wheel. The shaft 66, which is turning in a counterclockwise direction under the driving force of the electric motor will then turn the locked cam 65 with it in this direction. Fig. 1 shows the parts in their initial positions before the locking pawl 89 has been released to lock the cam with the locking wheel. As the roller 100 rides on the surface of the cam 65 the arm 95 will move under the force of the spring 103, 104, 105 to the position shown in Fig. 4 when the roller reaches the low point on the cam. During this downward movement of the arm 95 the cam 108 on the end of said arm rides along the roller 148 of the operating lever 141 until the Fig. 4 position is reached when said roller will be cleared of the cam 108.

At this point in the operation the arm 107 has moved to a position to hold the depending arm 71 away from its associated trip lever 77 to allow the shoulder 87 on said trip lever to engage the projection 88 when the cam 65 completes its one revolution. It also will be observed that at this point, or during the downward movement of the lever or arm 95, the arm 147 of the operating lever 141 has also moved slightly downward from the position shown in Fig. 1 to that shown in Fig. 4. This movement of the arm 147 and its associated lever 141 is transmitted to the lever 142 (Fig. 7) to cause the engaging portions 150ᵃ and 151ᵃ of the controlling pawls 150 and 151 respectively to move from a position in which they are above or on top of the upwardly extending projections 183 of the associated engaging or actuating pawls 184 to the position shown in Fig. 4 where it will be seen that the engaging portion 150ᵃ is to the rear of the projection 183. Engagement of the downwardly extending projection 146 with the end of the slot 181 limits this downward movement of the arm 147 and consequent partial counter-clockwise rotation of the associated operating levers 141 and 142. It will be apparent that any forward movement of the controlling pawls 150 and 151 will turn their associated actuating pawls 184 about their pivots 185 and into engagement with the snatch roll 63.

As the cam 65 continues its rotation in a counter-clockwise direction it will start to move the arm 95 upward against the tension of the spring 103, 104, 105 from the position shown in Fig. 4 back to the initial or starting position shown in Fig. 1. When the arm 95 starts this upward movement the cam 108 attached thereto will engage the under side of the roller 148 to turn the lever 141 in a clockwise direction. Such a turning of the lever 141 will likewise turn the associated lever 142 in a corresponding direction due to the interconnection of these two levers by means of the bail 145. This movement of the levers 141 and 142 will draw their associated pawls 150 and 151 respectively in a forward direction causing the engaging portions 150ᵃ and 151ᵃ to engage the upwardly extending projections 183 of the associated pawls 184 to cause said pawls 184 to turn in a counter-clockwise direction about their pivots 185 and allow the hook-like portions 197 thereof to be engaged by one of the teeth of the snatch roll 63. Thus, with a single actuation of the "0" numeral key 67ᵃ there is effected an engagement of two actuating pawls 184 with the snatch roll 63. One of these pawls 184 is associated with the "0" type bar in segment A and the other is associated with the "0" type bar in segment B.

Upon being moved into engagement with the snatch roll 63 which is rotating in a counter-clockwise direction, the two actuating pawls 184 will be drawn downward thus bringing the associated type bars in segments A and B upward and rearward to their respective printing points Pᵃ and Pᵇ by means of the sub-levers 204 and the actuating levers 201. When the actuating pawls 184 reach their lowermost position and the associated type bars have been swung to the printing point, said actuating pawls 184 will engage the usual stops 205 to force said pawls out of engagement with the snatch roll 63 allowing the parts associated therewith to return to normal position.

It will be apparent that when the actuating pawls 184 have been caused to engage the snatch roll 63 and they start to move downward to effect an actuation of the associated type bars, the projections 183 on said pawls will be moved out of engagement with the engaging portions 150ᵃ and 151ᵃ on the controlling pawls 150 and 151. During this actuating movement of the pawls 184, the cam 65 has completed its revolution, and the lever 95 and its cam 108 have been returned to their normal positions to allow the operating levers 141 and 142 to also return to the positions shown in Fig. 1. With the controlling pawls 150 and 151 in this normal starting Fig. 1 position, when the actuating pawls 184 move upward after having been released from the snatch roll said projections 183 will come to rest on the under side and forward of the engaging portions 150ᵃ and 151ᵃ. Thus, the parts are again all in their normal positions and ready for another actuation should the "0" numeral key 67ᵃ again be depressed.

As was explained above, the type bars for the special character keys are operated exclusively of the cams 65 and receive their actuation directly from the control unit and the snatch roll. I shall now describe these special character keys and their manner of operation.

Referring to Figs. 1, 2 and 10 it will be seen that substantially horizontally disposed special character key levers 206 having special character keys 206ᵃ extend in fore and aft vertical, parallel planes and are fulcrumed at their rear ends on the common fulcrum bar 68. In the present instance, there are located in the right-hand portion of the keyboard as shown in Fig. 10 only three of these special character keys, the "star", "triangle" and "Min." keys, though it is to be understood that either fewer or more of said special character keys could be employed if desired. Each of the key levers 206 is provided, at a point directly over the control unit, with a depending arm or projection 207. There are three of these depending projections 207 which extend downward from their associated key levers into engagement with each of the pins 157, 165 and 173 on the operating levers 152, 160 and 167 respectively, which are the right-hand operating levers for the three special character keys.

When the operating levers for these special character keys are in normal position as shown in Fig. 1, the controlling pawls associated therewith will be in such position that their engaging portions will be rearward of the associated projections 183 on the trip pawls 184. The controlling pawls may assume these positions since the associated operating levers are not provided with rollers, like the rollers 148 which are engaged by the cams 108 to hold the controlling pawls for the numeral operating levers in the forward positions as described above. The normal positions of the operating levers 152, 160 and 167 are thus determined by the contact of the downwardly extending projections 156, 164 and 170 with the ends of their respective guide slots 181. Therefore, when one of the keys 206ᵃ is depressed, for example the "star" key, the projection 207 on the key lever thereof will engage the pin 157 to turn the lever 152 in a clockwise direction. This motion is transmitted to the lever 153 through the bail 154 and a forward movement of the controlling pawl 158 is effected. This will throw the associated actuating pawl 184 into engagement with the snatch roll 63 and cause a printing of the "star" proof of clearance signal in the left-hand segment A.

The operation of the mechanism associated with the other special character keys is the same as that just described for the "star" key. However, it is to be noted that, in connection with the "Min." key, each of the right and left-hand operating levers 167 and 168 is provided with a controlling pawl so that a printing of the "Min." sign will be effected in both the left and right-hand segments A and B.

In addition to the ten numeral keys, 67ᵃ and the three special character keys 206ᵃ and their associated key levers the machine of my present invention is also provided with a space bar 210. This space bar 210 is of the usual construction, being supported on spaced levers 211 which are fixed on a cross bar or shaft 212 which is pivoted in the usual manner on coned pivot screws 212ᵃ (Fig. 5) adjustably secured in the sides of the upper frame section 20. A depression of the space bar 210 causes a manual actuation of the escapement mechanism in the ordinary manner, such space bar being operatively connected with a lug 213 provided on the link 61 as shown in Fig. 2. The construction is such that when the space bar 210 is depressed the link 61 is moved rearward to bring about a letter space movement of the carriage. The above described numeral and special character keys, together with the space bar 210 make up the entire keyboard used in the present embodiment of my invention, as shown in Fig. 10.

*Silencing mechanism*

In various forms of billing and office recording in which a machine of the type described above is useful, it is very often desirable to fill in certain portions of the work sheet in one column only. That is, for certain parts of the work no duplicate printing is required. Hence, it has been found advantageous to provide means for cutting out or silencing the actuation of the type bars of one of the segments, either A or B. In the present instance, I have provided means for silencing the actuation type bars of the right-hand segment B. It will be recalled that, as described above, I have shown the escapement mechanism controlled by the type bars of the left-hand segment A so that even though the right-hand segment B is silenced, the machine will otherwise function in the ordinary manner. I shall now describe this silencing means.

Referring particularly to Figs. 1, 4, 5 and 6 it will be observed that a cross bar 214 underlies the controlling pawls for the type bars of the right-hand segment B. A left-hand supporting arm 215 and a right-hand supporting arm 216 attached to the cross bar 214 and extending rearwardly therefrom are loosely mounted on the space bar shaft 212. A pair of locking collars 217 prevent any lateral movement of the arms 215 and 216 along the shaft or cross bar 212. The cross bar 214 together with the supporting arms 215 and 216 constitutes a cut-out or silencing means which may be moved into and out of engagement with the controlling pawls of the right-hand segment. It will be apparent that when the silencing bail is raised all the controlling pawls of the right-hand segment will be moved out of engagement with the projections 183 of the associated actuating pawls 184, so that even though the companion operating levers of these raised controlling pawls be actuated none of the actuating pawls 184 for the type bars of the right-hand segment will be thrown into engagement with the snatch roll 63, and hence none of the type bars of segment B will be operated.

Figure 11:
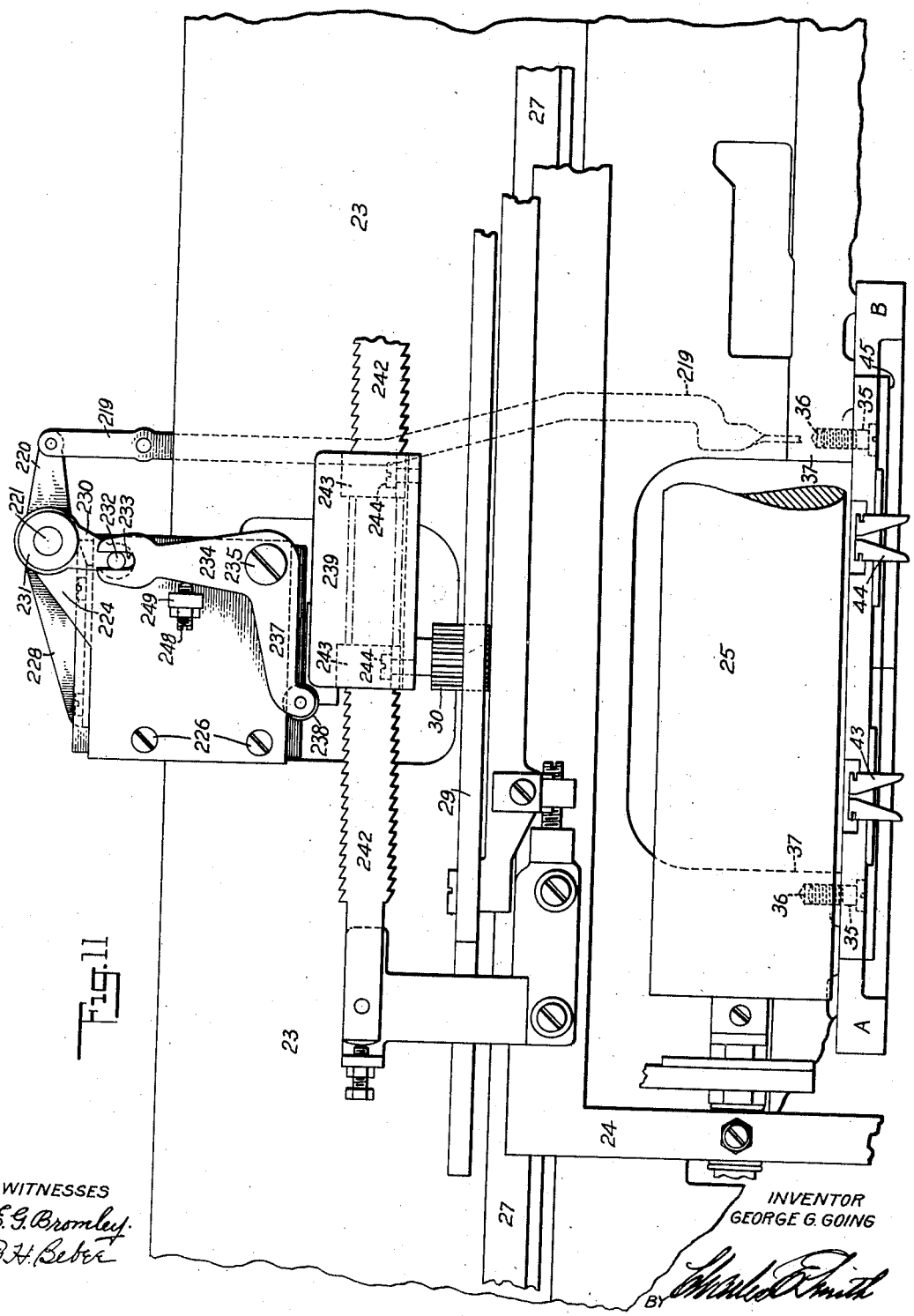
Fig. 11 is a fragmentary plan view of the upper rear central portion of the machine showing some of the controlling mechanism for the type bar silencing means.

Attached to the cross bar 214 substantially at the center thereof and extending rearwardly and downwardly therefrom, as shown in Fig. 1, is an arm 218. As shown in Figs. 2 and 11 the arm 218 is connected by means of a link 219 to a lever 220 fixed on the lower end of a rock shaft 221. The link 219 is detachably pivoted to the arm 218 and the lever 220 by means of a pin and flat spring connection. The rock shaft 221 extends substantially vertically up the rear of the machine from the bottom to the top thereof, being mounted at its lower end in a bracket 222 secured to the tabulator frame by screws 223 and at its upper end is journalled in an arm 224 provided on a special plate 225 which is attached by means of screws 226 to the top of the usual tabulator frame. A collar 227 at the upper end of the shaft and another collar 228 at the lower end of the shaft, which may be formed as part of the lever 220, hold the shaft in its proper position at the rear of the machine. A lever or crank arm 230 secured to the shaft 221 by means of a collar 231, extends forwardly from said shaft and is provided at its end with a pin 232 which registers with a slot 233 provided in the end of an arm 234. The slotted arm 234 is one arm of a bell crank which is pivoted by means of a screw 235 to a stud 236 secured to the plate 225. The other arm 237 of said bell crank extends to the left (Fig. 11) from the pivot 235 and is provided at its ends with a roller 238 which is adapted to ride on a cam 239. This cam 239 may be formed as one arm of a substantially U-shaped member 240, the other arm 241 of which embraces the usual tabulator stop bar 242, as shown in Fig. 2. Brackets 243 secured to the forward side of the member 240 by screws 244 further embrace the tabulator stop bar and hold the member 240, and consequently the cam 239, in its adjusted position thereon.

The construction of the above described parts is such that as the typewriter carriage moves to the left from the position shown in Fig. 11 the roller 238 will come into engagement with the cam 239 to turn the bell crank 234, 237 a short distance in a clockwise direction. This movement of the bell crank will transmit a counter-clockwise motion to the rock shaft 221 and hence a rearward movement of the links 219 and arm 218. To move the arm 218 a short distance toward the rear of the machine will effect a downward movement of the silencing bail and thus allow the controlling pawls for the type bars of the right-hand segment to come into engagement with the projections 183 of their associated actuating pawls 184. The silencing bail is resiliently urged in an upward direction by means of a spring 245 which is attached at one end to the arm 218 and at its other end is secured to a hook 246 provided on a cross bar 247 secured in the side plates of the upper frame section 20. The slotted arm 234 is limited in its movement to the left, as shown in Fig. 11, by means of an adjustable stop screw 248 which is mounted in a bracket 249 secured to the plate 225.

From the foregoing description it will be apparent that as long as the roller 238 is riding on the cam 239 the cross bar 214 will be in its lower position to allow the controlling pawls for the type bars of the right-hand segment to come into engagement with the projections on the associated actuating pawls. Thus, by varying or changing the length of the cam 239 the place and distance in the range of the typewriter carriage in which the type bars of both segments A and B will be actuated by the depression of a single key in the keyboard may be made longer or shorter as the circumstances of any particular case may demand. It is to be understood that the above described silencing means constitutes a means controlled by the travel of the carriage for rendering ineffective the actuating connection for certain only of the printing instrumentalities, whereby a varying number of printing instrumentalities are controlled by each key depending on the position of the carriage in its line of travel.

In the present instance, I have shown a construction in which the type bars of both segments may be actuated simultaneously when the roller 238 is in engagement with the cam 239. However, it will be understood that by changing the arm 218 from a downwardly extending one to an upwardly extending arm the reverse of this construction would easily be effected so that when the roller 238 was in engagement with the cam 239 the type bars of segment B would be silenced. That is, with such a change, the length of the cam 239 would control the distance in the range of the typewriter carriage in which the type bars of segment B would be silenced.

*Computing mechanism*

In order that the continuity of the foregoing description might not be destroyed and the explanation of the important features of my present invention obscured, I have delayed until now the description of the main parts of the computing mechanism and their method of actuation from the cam 65, except as they have been hereinbefore generally referred to. The computing mechanism, which is or may be used in combination with the hereinbefore described features of my present invention, is all fully disclosed in the patent to Wahl No. 1,270,471 above referred to, and is power actuated as completely set forth in the Hart application Serial No. 510,941, also referred to above. However, a summary of the general construction and operation of this mechanism will be included herein so that I shall have presented a full and complete showing of my invention, as it is included in combination with a computing or calculating mechanism.

Figure 3:
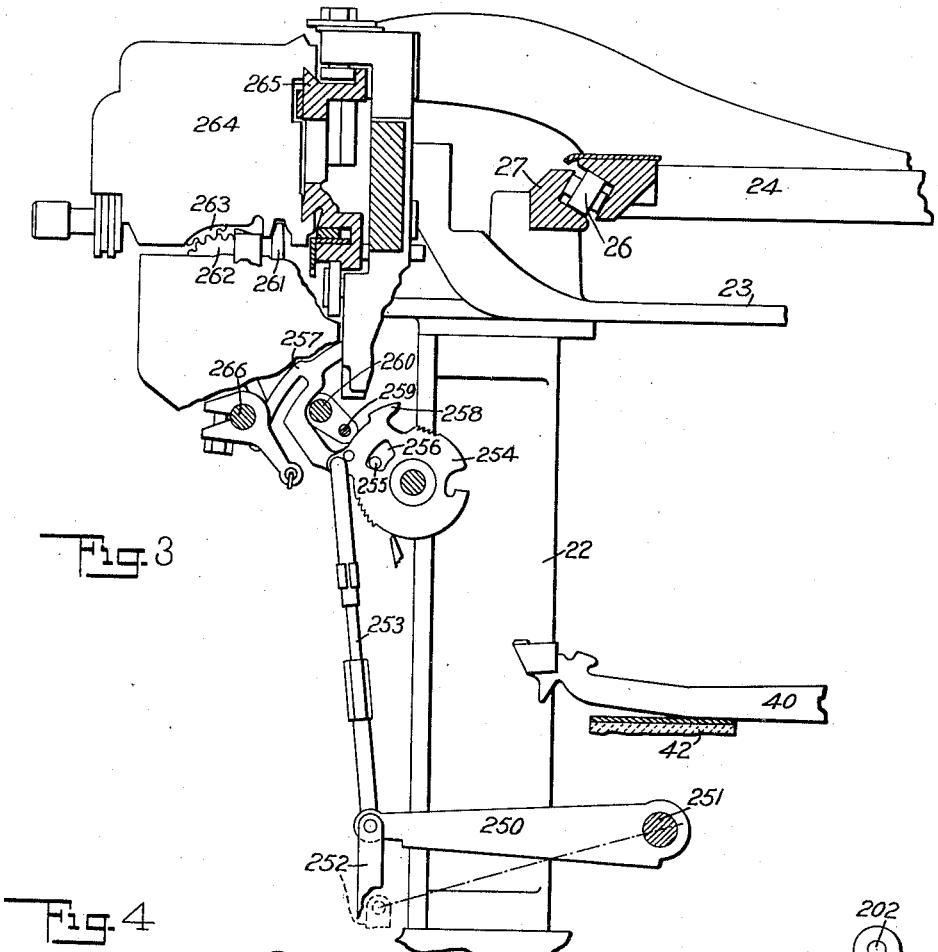
Fig. 3 is a fragmentary, vertical, fore and aft sectional view of the upper front portion of the machine showing part of the computing mechanism.

Referring to Figs. 1 and 3 it will be seen that there is provided a series of computing mechanism actuator arms 250, one for each of the members 95 employed. The arms 250 are loosely mounted on a pivot rod 251 which is supported by brackets secured to the upper frame section 20. Each arm 250 is connected by a link 252 with the companion actuating member 95, the construction being such that each member 95 in its downward motion under the force of its spring 103 will positively actuate its companion arm 250.

Connection between each of the arms 250 and the computing mechanism is effected by a series of upstanding links 253, one of them connected to each arm 250. Each link 253 is connected at its upper end to a so-called fan 254 which is connected in the usual manner through a pin and slot connection 255, 256 with its goose neck 257. Each fan 254 has a cam 258 that coacts in the usual manner with a universal bar 259 carried by and fixed to the universal shaft 260 to bring about the preliminary operations of the actuator. These preliminary operations, which are well known in the Wahl computing mechanism and include among other things the actuation of the master dog 261, must be effected before a differential motion is transmitted to the master wheel 262 through the medium of one of the goose necks 257. The master wheel 262 successively registers and meshes with the different gear wheels 263 in a vertical totalizer, designated as a whole by the reference numeral 264 in Fig. 3, as said totalizer receives a step-by-step movement with the typewriter carriage and moves through the computing zone. There may be any desired number of these vertical totalizers detachably carried by and adjustable on the usual supporting bar or truck 265. The supporting bar or truck 265 is connected to travel with the typewriter carriage 24 and thus the vertical totalizers carried on said truck are given a step-by-step movement through the computing zone in the usual manner.

In the present instance I have not shown the cross totalizer mechanism of the usual Wahl computing mechanism, but if such were employed, the master wheel or wheels therefor would be controlled by the differential shaft 266 in the usual manner. In most types of work in which it is advantageous to use the devices of my invention so that entries may be made simultaneously on more than one sheet, or in more than one column on a single sheet, the cross totalizer if used may be arranged to record a grand total of the various sub-totals recorded in the vertical totalizer.

It is to be understood that, as in the ordinary Remington bookkeeping machine, each time a numeral key is depressed an entry of the amount controlled by said key is made in the computing mechanism and subsequently this amount is printed on the work sheet or sheets; and in the present instance, since the machine has two type bar segments and a separate printing point for each segment, the amounts entered into the computing mechanism may be printed in two separate columns on said work sheet. That is, there is a definite cooperation between the numeral keys, the computing mechanism and the type bars of segments A and B.

QUADRUPLE SEGMENT MACHINE

In Figs. 12, 13, 14, 15 and 16 there is shown another form of my invention in which there are four separate type bar segments having four distinct printing points mounted within the frame structure of an ordinary Remington bookkeeping machine. This form of my invention is very similar to the above described dual segment machine, the main difference residing in the construction of the quadruple type bar segment and the control unit, as will hereinafter more clearly appear. In describing this modified form of my invention, since all other parts of the machine are the same, or substantially the same, as those described above for the dual segment machine, I shall only describe in detail the new type bar segment and control unit. In this description and in the drawings, the parts that are identical with those described above will bear the same reference numerals.

Figure 12:
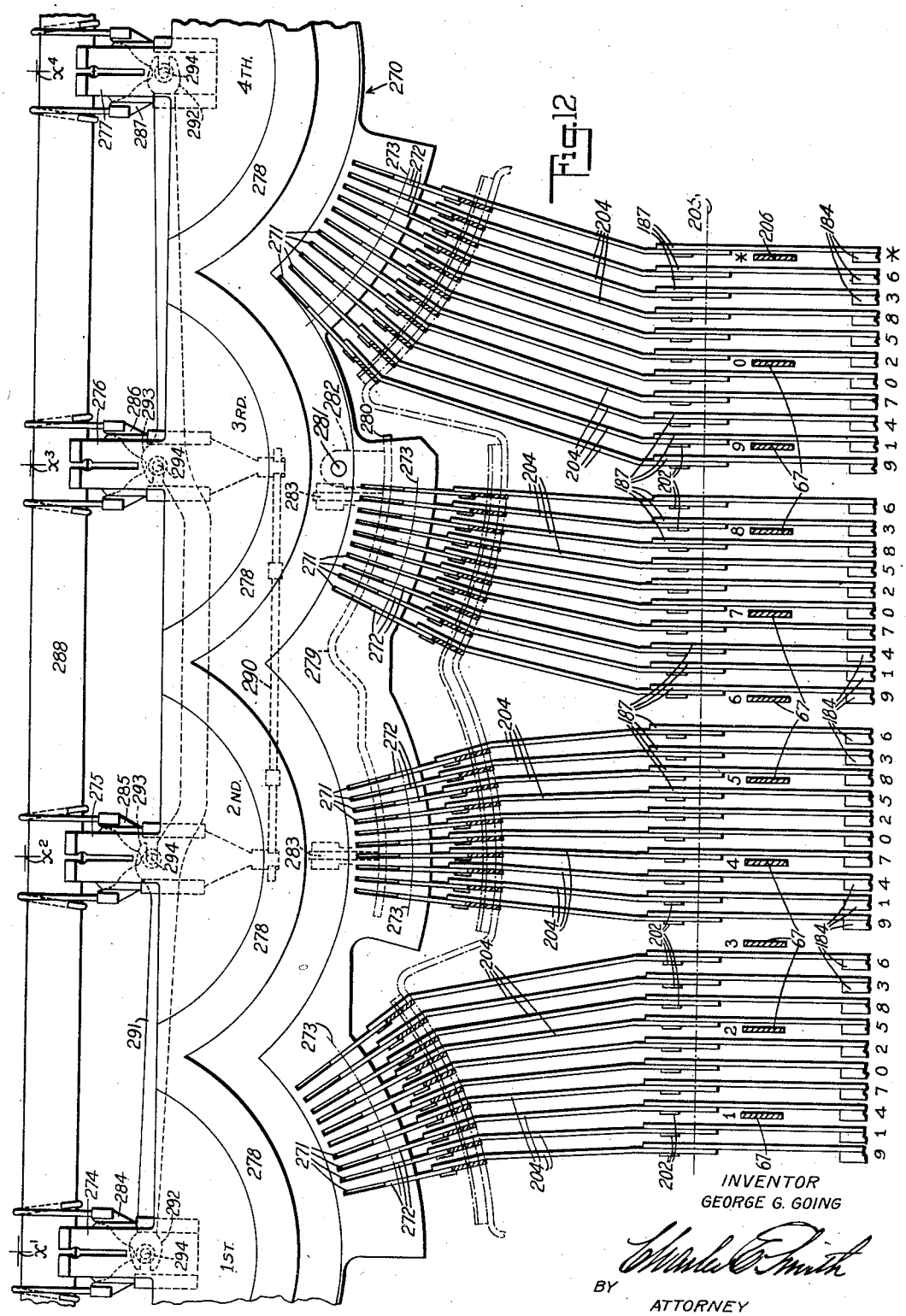
Fig. 12 is a fragmentary, transverse, vertical sectional view similar to Fig. 6 but in a machine in which a quadruple segment is employed.

Referring particularly to Fig. 12 it will be observed that there is provided a special casting which is designated as a whole by the reference numeral 270 and which will hereinafter be referred to as the quadruple segment. This special casting comprises four segmental portions, which are numbered consecutively from left to right as shown in Fig. 12, 1st, 2nd, 3rd, and 4th, said casting being mounted in a machine by means of special brackets which may be secured to the channel portion of the top plate below the platen 25. These brackets may be the same as the brackets 407 shown in Fig. 20 in conjunction with another form of my invention. Each of these four segments or segmental portions is radially slotted at 271 to receive and guide a set of printing instrumentalities or type bars 272, the type bars of each segment being pivoted on a fulcrum or pivot wire 273. When the type bars are at rest they occupy a substantially horizontal position and the construction is such that the type bars in the 1st segment may be moved in radial planes upward and rearward from their normal resting position and through one of the usual type guides 274 to strike at a common printing center $X^1$ on the front portion of the platen 25. Likewise the type bars of the 2nd, 3rd and 4th segments may be moved upward and rearward through type guides 275, 276 and 277 respectively to strike the platen at common printing centers $X^2$, $X^3$ and $X^4$ respectively. The printing points $X^1$, $X^2$, $X^3$ and $X^4$ are, in the present instance, spaced at equal distances one from the other, but it is to be understood that the distances between these printing points may be varied to meet the requirements of any particular case.

In the present instance, as in the above described dual segment machine, the four segmental portions each correspond to some portion of one of the usual type bar segments for a full complement of printing instrumentalities. That is, each radial slot 271 occupies a position corresponding to that of some particular slot of a regular segment so that regular type bars, bell cranks, sub-levers, key levers, etc. may be used to carry out my invention. The segmental portions are similar to a regular segment further in that each is provided with an arcuate anvil 278 on the forward side thereof.

On the rearward side of the 2nd and 3rd segments there is provided a curved slot or groove 279 for the reception of a universal bar 280, the linear curvature of which allows it to fit or register in the groove 279. The curved portions of the groove 279 are near the lower portions of the 2nd and 3rd segments and cross the slots 271 so that the usual curved heel portion of each type bar of the 3rd segment will project through its slot 271 and into the groove 279 when the type bars are swung up to the platen. The regular heel portions of the type bars of the 2nd segment are cut off, so that only the type bars of the 3rd segment will effect an actuation of the universal bar 280.

In the present instance it is assumed that at no time in the use of a quadruple segment machine of the present construction is it desired to silence the operation of the type bars of the 3rd segment, and hence the type bars of this segment actuate the universal bar 280 in a well known manner when they are swung to the printing position. A pin 281 attached to an ear 282 provided on the universal bar 280 near the right-hand portion thereof, and registering with a circular opening in the segment casting, guides said bar 280 in its movement. The movement of the universal bar 280 is transmitted by a pair of arms 283 to a pivoted frame like the frame 54 and thence on to the escapement mechanism, in the same manner as described above for the dual segment machine, to effect a letter space movement of the carriage.

In the present instance, each of the four segmental portions is provided with a set of ten printing instrumentalities or type bars 272 which include the ten numeral type bars for the numerals "0" to "9". As shown in Fig. 12 the type bars for each of the 1st, 2nd, 3rd and 4th segments are arranged in the following order reading from left to right: "9", "1", "4", "7", "0", "2", "5", "8", "3", and "6". A numeral representing each of these type bars is shown at the bottom of Fig. 12 below a part of the actuating mechanism for each of said type bars. It will be observed that in the 4th segment, apart from the ten numeral type bars, there is provided a special character type bar which, in the present instance, is the "star" key for the proof of clearance signal. The 4th segment is the only segment provided with this special character type bar, and the "star" character is the only special character used, though it is to be understood that if desired any of the other three segments could be provided with special character type bars and other special character keys could be used. The keyboard used in conjunction with this quadruple segment machine may have the same arrangement as that shown in Fig. 10 with the additional special character keys eliminated.

Since, in the present form of my invention, there are four type bar segments; the ribbon carrying mechanism will be specifically different from that described above for the dual segment machine. Mounted on each of the type guides 274, 275, 276, and 277 for sliding engagement therewith are four ribbon carrying slides 284, 285, 286 and 287 respectively, having a single printing ribbon passing through the carrying or guide wires of each of said slides as shown in Fig. 12. The slides 285 and 286 for the 2nd and 3rd segments are like the slides 193 used in the dual segment machine and have their lower depending portions secured to a supporting rod 290 which is connected with the usual ribbon vibrating mechanism. In order that the oscillatory movements of the ribbon vibrator may be transmitted simultaneously to all four of the ribbon carrying slides I have provided a cross connecting member 291 which corresponds in length to the distance between the first and fourth ribbon carrying slides 284 and 287 respectively. This connecting member 291 is provided with slotted engaging portions 292 at each of its ends and at two points intermediate its ends is provided with two slotted engaging portions 293. The two slotted portions 292 engage with headed pins provided on the ribbon carrying slides 284 and 287 while the central engaging portions 293 are in engagement with the headed pins 294 on the ribbon carrying slides 285 and 286. Thus, the four ribbon carrying slides are connected to operate in unison by means of the member 291 each time the ribbon vibrating mechanism moves after the actuation of one of the numeral key levers.

*Control unit*

Aside from the difference in construction of the type bar segment casting and its associated ribbon carrying mechanism, the only other difference in my modified quadruple segment machine resides in the specific construction of the control unit. It is readily apparent that the control unit would have to be changed because of the increased number of type bar segments and the resultant increase in the number of type bars. I shall now describe this modified control unit.

Referring particularly to Figs. 13, 14, 15, 16 and 17 it will be observed that the control unit, which will be designated as a whole by the reference numeral 300, comprises a group of operating members mounted on a shaft or pivot rod 301. The pivot rod 301 may be fixedly secured in the special brackets 112, which are bolted to the sides of the upper frame section 20 of the machine. The operating members mounted on the pivot rod 301 are, in the present instance, of two separate and distinct types one type being controlled by the numeral keys, and the other type being controlled by the special character key.

Each of the operating members for the ten numeral keys is substantially alike in construction, the slight differences being brought about by the relation between the position of the operating member on the pivot rod 301 and the position of its controlling numeral key in the keyboard. I shall describe in detail the construction of the operating member for the "9" numeral key, and shall afterwards explain how the operating members for the other numeral keys in the keyboard differ from this construction.

Each of the operating members for the ten numeral keys is formed or made up of four basic sections, and as shown in Figs. 14 and 15 one operating member comprises sections *a*, *b*, *c*, and *d*. One complete section, similar to section *b* shown in Figs. 14 and 15 but particularly associated with the "4" numeral key in section *b* is illustrated in perspective in Fig. 17 and designated as a whole by the reference numeral 302. This section, which may be regarded as a typical or basic section of an operating member, comprises an operating lever 303 having an opening 303ᵃ therein by which said lever may be mounted for rotation upon the pivot rod 301. Extending to the right from the lever 303 as shown in Fig. 17, is an arm 304 provided at its end with a roller 305 secured thereto by means of a pin 306. This arm 304 and its roller 305 correspond to the arm 125 and the roller 126 of an operating lever in the control unit of the dual segment machine, and like said arm the arm 304 is actuated by contact of the cam 108 on the member 95 engaging the roller 305 on said arm. The left-hand portion of the lever 302 is enlarged as at 307 and has pivoted to this enlarged portion a controlling pawl 308 which is like the pawls used in the control unit of the dual segment machine. The controlling pawl 308 is pivoted at 309 to the right-hand face (Fig. 17) of the enlarged portion 307 and is given a tendency to turn in a counter-clockwise direction by means of a spring 310 attached at one end in an opening 311 in the pawl 308 and at its other end to a pin 312 provided in the lever 303. As shown in Fig. 13 this controlling pawl 308 is adapted to cooperate with one of the upwardly extending projections 183 provided on the actuating or engaging pawls 184 to effect an engagement of said pawl with the snatch roll 63.

Extending to the right (Fig. 17) and slightly downward from the lever 303 at a point 313 below the opening 303ᵃ is an arm 314 which is provided at its end with a depending projection 315 the purpose of which will hereinafter more clearly appear. At a point 316 which is between the point 313 and the arm 304 is another arm 317 which extends to the left from the lever 303 which is the same length as the arm 314. At the end of the arm 317 and in a plane parallel to the lever 303 said arm is provided with a curved portion 318 which curves downward and to the left from the arm 317 and terminates in a depending projection 319. The projection 319 is in horizontal alignment and parallel with the projection 315, and also has a similar function, as will presently appear.

As was stated above one complete operating lever is made up of four of the basic sections 302 described above. For example, the operating levers for the "9" and "0" keys comprises four modified basic sections 302, said sections being designated as *a*, *b*, *c*, and *d*. Section *a* comprises one of the sections 302 in which the arms 304 and 314 have been removed. Sections *b* and *c* comprise basic sections 302 in which the arms 304 have been removed. Section *d* comprises one of the basic sections 302 in which the arm 317 has been removed. These four modified basic sections 302 are then secured together by spot welding projection 319 to projection 315 between sections *a* and *b*, by securing projection 319 to projection 315 with screws 320 between sections *b* and *c*, and by spot welding projection 319 to projection 315 between sections *c* and *d*. Sections *b* and *c* are secured together by screws rather than spot welding so that the entire control unit may be more readily assembled.

The operating levers for the "7" and "8" keys are constructed in the same manner as that hereinbefore described for the "9" and "0" keys. However, due to the position that the "7" and "8" keys occupy in the keyboard, it is found advantageous to remove the arm 304 from section *d* and leave the arm 304 and roller 305 on section *c*. The operating levers for the "4", "5" and "6" keys have arms 304 in section *b*, with said arms removed in the other sections; and the operating levers for the "1", "2" and "3" numeral keys have an arm 304 and roller 305 in section *a* with said arms removed in the other sections.

The operating lever for the "star" key is shown in plan and elevation in Figs. 14 and 15 and an end view thereof is shown in Fig. 13. Referring particularly to Fig. 13 it will be observed that this member, which is designated as a whole by the reference numeral 321, comprises an operating lever 322 and a left-hand operating lever 323, shown in dotted line, said right and left-hand operating levers being connected by an interconnecting bail 324, as shown in Fig. 15. The right-hand operating lever 322 is provided with an enlarged depending portion 325 having pivoted on the left-hand face thereof, at 326, a controlling pawl 327 which is given a tendency to turn in a clockwise direction about its pivot by means of a spring 328. On the upper edge of the lever 322 is a pin or stud 330 which cooperates with the depending projection 207 provided on the "star" key lever 206. It is this "star" key lever 206 which acts directly into the control unit to effect an operation of the "star" type bar in the same manner as the corresponding key is operated in the dual segment machine as described above. Extending downwardly from the lever 322 at a point below the shaft 301 is a finger or projection 331 which has the same function as the projections 315 and 319 on the other operating levers of the control unit as will hereinafter more clearly appear.

In addition to operating the "star" type bar directly from the key lever 206, means may be provided which cooperate with a headed pin 332 on the left-hand face of the lever 323 (Fig. 15) and by which the "star" type bar may be operated automatically upon clearance in the vertical totalizer.

All of the above described operating levers for the numeral keys and the special character keys are mounted at spaced intervals along the pivot rod 301 in the following order, the numbers used designating the particular type bar controlled by the operating lever: "9", "1", "4", "7", "0", "2", "5", "8", "3", "6". In the 4th segment, in addition to the operating levers for the numeral key, there is the lever 322 for the "star" key which is positioned just to the right of the last operating lever 303 in section $d$ for the "6" key, as shown in Fig. 14. The lever 323 for this special character key is mounted in the third section $c$ between the operating levers for the "6" and "9" keys in that section. All of the operating levers are maintained in their proper spaced positions along the pivot rod 301 by means of a comb 333 having slots 334 therein with which the projections 319 and 315 for the numeral keys, and the finger 331 for the special character key, register. This comb 333 is mounted in the same manner as the comb 174 on an arm provided on the special bracket 112.

The operation of the above described quadruple segment machine is the same as in the dual segment machine, but in the present instance the construction of the operating levers is such that the actuation of a single numeral key will effect a printing of four corresponding numeral type bars. Each of these four type bars will be from one of the four segments and each will print at a separate and distinct printing point on the work sheet or sheets. However, with reference to the special character key, there will only be a printing in the 4th segment at the fourth printing point $X^4$ since, as pointed out above, the 4th segment is the only one which is provided with a "star" type bar. It will be apparent that since the escapement is controlled by the type bars of the 3rd segment, in the present instance, there will be no letter space movement of the carriage upon printing of the clearance proof signal.

It is to be understood that, if desired, computing mechanism of the usual type as described above for the dual segment machine may be used in combination with the present form of my invention. If such mechanism were employed, it will be obvious that a depression of a single numeral key will effect an entry into the computing mechanism and also a simultaneous printing of the amount controlled by said key at the four distinct printing points $X^1$, $X^2$, $X^3$ and $X^4$.

If it is desired to cut out or silence the operation of the type bars of any particular segment or segments, silencing mechanism of the type described above for the dual segment machine may be used in conjunction with this modified form of my invention. However, since in the present form of the quadruple machine the escapement is under the control of the type bars in the 3rd segment, it would not be desirable at any time to silence the operation of the type bars of this 3rd segment.

If for any particular use or purpose it should be desired to construct and use a machine having only three segments, it will be apparent that such a machine can be made easily by slightly modifying the above described quadruple segment machine. The most important changes would be in the construction of the control unit and in the number of type bars employed; though to properly fit the quadruple segment control unit for a three segment machine it would only be required to remove one of the basic sections from each of the operating members for the ten numeral keys. This would be the same or corresponding section from each operating member, for example section $b$ as shown in Figs. 14 and 15. Thus each operating member would have only three of the operating levers 303 to control the actuation of type bars in three segments. With such a construction in the control unit the type bars and actuating levers from either of the end segments could be omitted, and the remaining construction would be a practical triple segment machine.

In both of the above described dual and quadruple segment forms of my invention, and also in a triple segment machine if such were to be made, the entire mechanism is mounted in a machine frame of standard construction, such as the frame structure of a regular No. 85 Remington electrified bookkeeping machine. In other words, the present arrangement is such that a plurality of type bar segments with their respective companion parts may be mounted within the transverse field occupied by the standard arrangement of the printing keys associated therewith. In addition to the mechanism being mounted within a regular frame structure, the construction of the parts is such as to allow the use of as many standard operating parts as possible. That is, the power driving devices, with the exception of the arm 95 (of the form shown in the present construction) and the control unit, are all of standard construction, and the cams and snatch roll and their respective shafts are the same as those employed in the regular Remington machine. In the upper frame section the key levers, actuating levers, bell cranks, type bars, escapement, etc. are likewise all standard parts.

DUAL SEGMENT MACHINE WITH FULL COMPLEMENT OF TYPE BARS

In Figs. 18 to 28 I have shown still another form of my invention, which though it is a dual segment machine, is different in many respects from the form of dual segment machine shown in Figs. 1 to 11. In the present modified form of the construction the second segment of type bars is added in the nature of an attachment to a standard Remington electrified bookkeeping machine without materially changing said machine. The additional segment contains type bars for the numerals "0" to "9" and for two clearance proof signals, while the main segment in the regular machine contains a full complement of forty-six type bars including alphabet, numeral, clearance proof, and special characters. Thus, the machine is not confined to the writing of numerals alone but in the preparation of duplicate invoices, ledgers and statements, stub invoices and other forms of work the full complement of type bars in the main section of the machine may be used for the writing of description and other data.

The second segment for the duplicate printing of the numerals, which will be hereinafter referred to as the "second printing unit", is a unit attached to the left side of the Remington electrified bookkeeping machine which will be hereinafter referred to as the "main unit." The second printing unit is controlled by ball connections to operating levers in a control unit, as in the above described constructions embodying my invention, said operating levers being under the control of the numeral and clearance proof character keys in the keyboard of the main unit. The principle employed in operating the duplicate printing unit is very much the same as used in the above described forms of my invention, the main difference in the present construction residing in the construction of the interconnecting bails in the control unit as will hereinafter appear.

In the normal construction of Remington electrified bookkeeping machine, such as is disclosed in the Hart application Serial No. 510,941 above referred to, the numeral type bars are operated by the usual cams, such as the cam 65 shown in Fig. 1, and the alphabet type bars, and special character type bars are operated directly from the snatch roll by means of the pawls 184 which are thrown into engagement with said snatch roll directly from the key levers. However, in order to fit one of the standard Remington electrified bookkeeping machines for the attachment and operation of a second segment, it has been found advantageous to alter this construction.

The alteration of the regular machine, though it changes the manner of operating the type bars, may be said to be a minor alteration since, in the main, the operating parts remain the same. The change in the operation of the standard machine is effected by inserting in such a standard machine a control unit similar to those described above for the other form of dual and quadruple segment machines. By inserting a control unit into this machine, the numeral type bars are operated from the snatch roll under the control of the regular cams and control unit, and the alphabet and special character type bars are likewise operated from the snatch roll but directly through the control unit. That is, the standard machine has been changed so that it operates in its entirety in the same manner as described above for the other form of dual segment machine. Thus, as in the previously described forms of my invention there are two distinct types of operation for the various type bars in the machine; first, the operation for the numeral type bars; and second, the operation for the special character type bars. In the present form of my invention, the alphabet type bars are operated in the same manner as the special character type bars in that their key levers effect an engagement of the associated trip pawls with the snatch roll by a direct actuation of the operating levers in the control unit.

In describing this modified form of my invention, I shall first explain in more detail how the standard machine has been changed, and shall follow this with a description of the second printing unit which is attached to the side of the modified standard machine. However, before beginning the description of the two units going to make up this modified form of my invention, I shall describe the general arrangement of the entire machine with the second printing unit attached thereto.

Referring particularly to Fig. 18, it will be observed that the machine comprises a main unit, designated as a whole by the reference numeral 340, and a second printing unit attached to the left-hand side of the main unit 340, said second printing unit being designated as a whole by the reference numeral 341. The said second printing unit has its driving devices directly connected to the driving devices of the main unit 340 and the type bars contained in the second printing unit are operated from a separate snatch roll but are under the control of the numeral keys and clearance proof character keys in the keyboard of the main unit, all as will hereinafter more clearly appear.

The main printing unit

As stated above the main unit 340 is a regular Remington electrified bookkeeping machine in which certain changes have been made. Referring to Fig. 28, it will be seen that the frame of the unit in question is as usual made up of two sections, a lower or base section 342 and an upper section 343. These sections are hinged together at 344 so that the upper section 343 may be swung back to give access to the parts contained within the frame. As is usual in Remington machines of this character, the construction of the mechanism is such that the cooperating parts thereof carried by the two frame sections are brought into cooperative relation ready to function when the two frame sections are brought together as they are shown in Fig. 28.

Power is transmitted to the operating mechanism from a continuously running electric motor 345 (Fig. 28) supported on a supporting member or bracket 346 secured to the base section 342 of the machine. Thus, a driving belt 347 extends from a pulley 348 on the motor shaft over a pulley 349 of a belt tightener to a pulley 350 on a stub shaft 351. This stub shaft carries a pinion which meshes with a gear fixed on a shaft 352 on which are loosely mounted the usual cams, like the cam 65 described above. The shaft 352 likewise carries a pulley 353 which cooperates with a belt 354 that is received on a pulley 355. A belt tightener 356 coacts with this belt and the shaft 357 on which the pulley 355 is mounted constitutes the shaft on which a snatch roll 358 is mounted. This snatch roll is employed to actuate all of the numeral and special character type bars in the same manner as has been described above for the other forms of my invention and also is employed in the present form of the construction to actuate the alphabet type bars. In Fig. 21 it will be observed that the snatch roll shaft 357 projects beyond the base section 342 at the left-hand side of the machine and has a pinion 360 fixed to the left-hand end thereof which cooperates with an idler 361. This idler in turn meshes with a gear 362 fixed on a shaft 363 which is the shaft that controls the tabulator mechanism in a well known manner.

The shaft 352 and the cams carried thereby are the same as the shaft 66 and cams 65 shown in Fig. 1, and the snatch roll 358 is the same as the snatch roll 63. In addition to the similarity of these driving devices, the parts associated therewith, with the exception of the control unit 110, are also the same as those shown in Fig. 1. That is, in the present form of my invention each of the ten cams on the shaft 352 cooperates with a member like the arm 95 to effect an actuation of the computing mechanism and an actuation of a companion operating lever in the new control unit. Likewise, the pawls cooperating with the snatch roll 358 are the same as the pawls 184 and function in the same manner in connection with their associated actuating levers, bell cranks and type bars. Since this mechanism is all the same as that shown in Fig. 1 which has been described above, it will not be described herein in conjunction with this third form of my invention.

Referring to Figs. 18, 23 and 28 it will be seen that the upper frame 343 comprises corner posts 365 and a top plate 366. This top plate is slightly different from the usual construction in that it is lengthened at the left-hand side thereof so that it may cover the second printing unit 341, as will hereinafter appear. A carriage 367 (Fig. 20) of usual construction and having a platen 368, is mounted in the usual manner in roller bearings 367ª to travel over the top plate 366 of the machine and over both the main and second printing units. Said carriage is spring impelled in the direction of its feed by the usual spring drum (not shown) under control of the usual escapement mechanism, and a step-by-step letter space advance thereof is effected in the usual manner during the operation of the type bars.

Secured to the top plate 366 by means of screws 370 is the main type bar segment 371 which is radially slotted at 372 to receive and guide a full complement of forty-six type bars 373 that are pivoted on a pivot wire 373ª. These type bars move in radial planes upward and rearward from their normal substantially horizontally disposed positions through the usual type guide 372ª and strike at a common printing point at the front portion of the platen 368. The type bar segment 371 is the regular accounting machine type bar segment usually employed in Remington electrified bookkeeping machines. In Fig. 23 it will be observed from the character designations that the numeral type bars are dispersed at substantially regular intervals along the arc of the segment, and the actuating levers for said type bars occupy substantially the same spaced relation as the numeral keys in the keyboard depicted in Fig. 18. The alphabet type bars and special character type bars including the clearance proof signals complete the remainder of the segment.

Each of the type bars 373 is connected by means of the usual bell crank 374 to one of the usual actuating or sub-levers 375 (Fig. 23) which carries one of the usual actuating pawls 376. As stated above, the actuating pawls 376, actuating levers 375 and bell cranks 374 are all of the regular construction as employed in Remington electrified bookkeeping machines. As in the other forms of my invention, and as will hereinafter appear the actuating pawls 376 are thrown into engagement with the snatch roll 358 to effect an actuation of their associated type bars through the action of the control unit.

The keyboard of the main unit is a standard Remington electrified bookkeeping machine keyboard and comprises, as shown diagrammatically in Fig. 18, alphabet and special character keys 377 having key levers 378 which are like the key levers 206 shown in Fig. 1. A space bar 380 of regular construction and operating in the usual manner to effect a letter space movement of the carriage 367 separates the alphabet and special character key 377, with the exception of the "star" key, from the usual numeral keys 381. The numeral keys 381 have key levers 382 which are like the key levers 67 and, as shown in Fig. 23, are interspersed at regular intervals between the key levers 378. All of the key levers 378 and 382 occupy positions adjacent their associated actuating levers 375 and with said actuating levers are fulcrumed at the rear of the machine on a common fulcrum bar 383 (Fig. 21) in the usual well known manner, being resiliently held in their uppermost positions by means of the usual adjustable returning springs 384. A depression of an alphabet key 377 will effect an actuation of its associated type bar in the main segment only, while a depression of a numeral key or one of the clearance proof keys, "star" or "triangle", will bring about an actuation of the associated type bar in the main segment and also of a companion and corresponding type bar in the second printing unit 341, as will hereinafter more clearly appear. It will also be understood that an actuation of one of the numeral keys 381 also will effect an actuation of the computing mechanism in the same manner as has been described above for the other form of dual segment machine, and as explained with reference to Fig. 3.

*Second printing unit*

Figure 22:
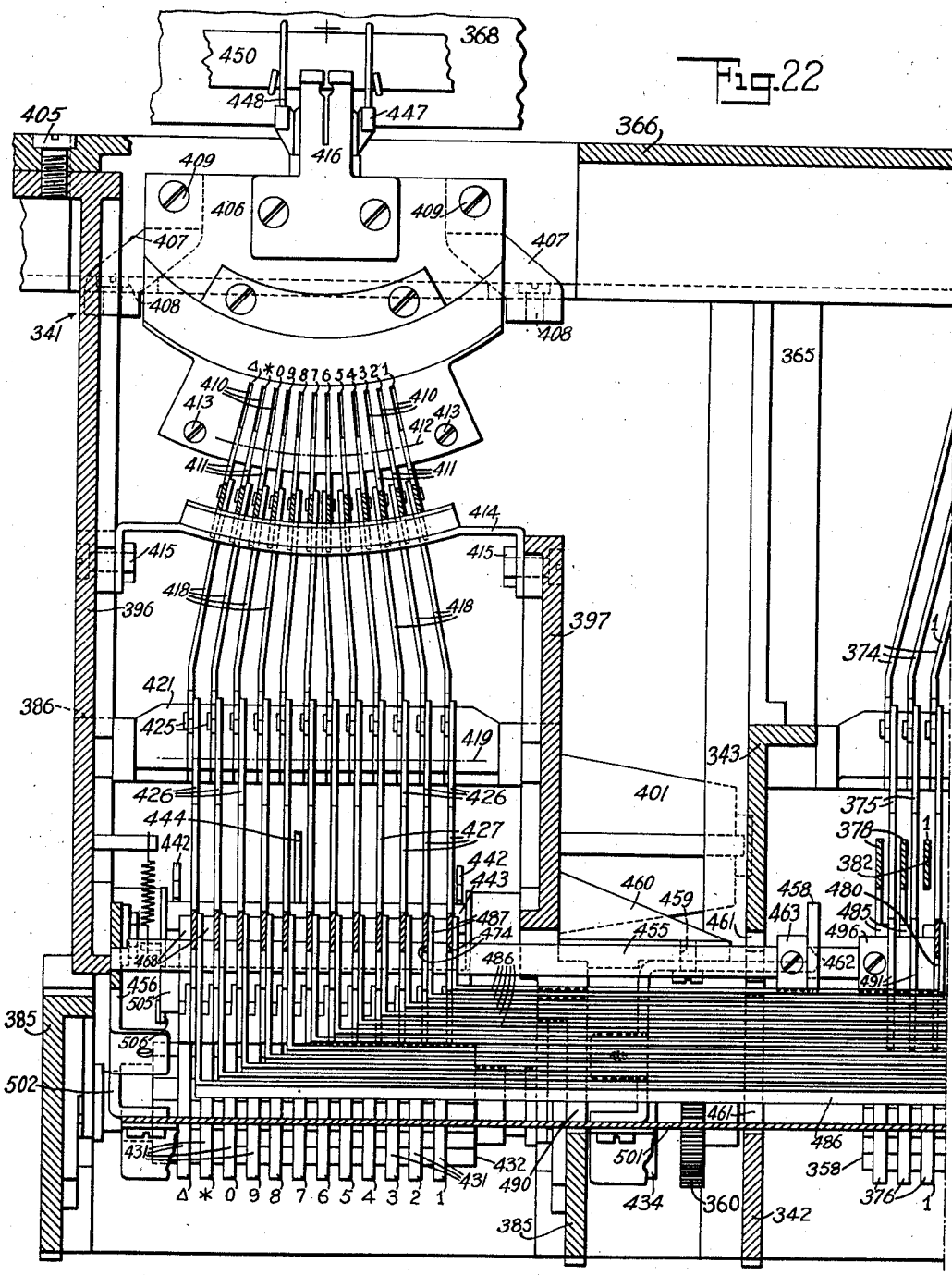
Fig. 22 is a fragmentary, transverse, vertical sectional view taken along the line 22—22 of Fig. 20 and looking in the direction of the arrows at said line, the view showing the arrangement of the segment and type bars in the dual printing unit.

Referring now to the second printing unit 341, and to Figs. 20, 21 and 22, it will be seen that this unit comprises a base section 385 and an upper section 386. The lower or base section 385, which is rectangular in shape, is secured to the base section 342 of the main unit by means of a flange 387 (Fig. 20) on the front of the base section 385 having screws 388 passing therethrough and into the base section 342 of the main unit. At the rear of the base section 385 of the second printing unit there is provided an arm 390 which extends to the right from said base section, as shown in Fig. 18, and has a rearwardly extending flange 391 by means of which it is secured with the aid of screws or bolts 392 to a bracket 393 provided at the rear of the main unit base section 342.

As shown in Fig. 21 the upper frame section 386 of the second printing unit is provided with left and right rear corner posts 394 and 395 respectively, and left and right front corner posts 396, 397 respectively, all of said corner posts being formed integral and in a single casting with the upper frame 386. This upper frame section is secured to the left-hand side of the upper frame section 343 of the main unit by means of forward and rear supporting arms 400 and 401 respectively (Fig. 21), said forward supporting arm 400 being fastened to the side plate of the frame 343 by means of bolts 402, and said rear supporting arm 401 being fastened to a bracket 403 with the aid of bolts 404. As was stated above, the top plate 366 for the main unit is lengthened at the left-hand side thereof to extend over the second printing unit, being secured to the corner posts 394 and 396 thereof by means of screws 405 as shown in Figs. 20 and 22. Thus, it will be apparent that the top plate 366 constitutes an additional means for securing the upper section 386 of the second printing unit to the upper section 343 of the main printing unit.

When the main printing unit, having the second printing unit attached to the left-hand side thereof, is in the normal position the upper frame section 386 of said second printing unit will rest on the base section 385 of said unit as illustrated in Fig. 20 and the cooperating working parts of the two frame sections will be in cooperative relation ready to function in a manner to be hereinafter described. Since the upper frame section of the second printing unit is secured to the side of the upper frame section of the main unit, it will be apparent that when the upper section 343 of the main unit is swung back on the hinges 344 to give access to the parts contained within the frame, the upper section 386 of the second printing unit will be carried therewith.

Referring particularly to Figs. 20 and 22, it will be observed that a second printing segment 406 is supported within the second printing unit by means of a pair of special brackets 407 which are fastened to the top plate 366 on the under side thereof by any suitable means such as the screws 408, said segment being secured to the brackets with the aid of screws 409. The second segment 406 is radially slotted at 410 to receive and guide a set of twelve type bars 411 which are pivoted on a fulcrum wire 412 that is removably secured in the segment by means of the screws 413. This set of twelve type bars includes ten numeral characters and the two clearance proof characters, "star" and "triangle", which are arranged on the fulcrum wire 412 and in the slots 410 in the following order reading from left to right: "1", "2", "3", "4", "5", "6", "7", "8", "9", "0", "star" and "triangle". When the type bars 411 are at rest they occupy a substantially horizontal position upon a rest 414 which is attached by any suitable means such as the screws or bolts 415 to the front corner posts 396 and 397. As in the other forms of my invention the segment 406 corresponds to some portion of one of the usual type bar segments for a full complement of printing instrumentalities. It should be observed that each radial slot 410 occupies a position corresponding to that of some particular slot of a regular segment so that the regular type bars, bell cranks, sub-levers, etc. may be used to carry out my invention. The construction and manner of mounting the type bars in the segment 406 is such that they may be moved in radial planes upward and rearward from their normal resting positions and through one of the usual type guides 416 to strike at a common printing center on the front portion of the platen 368.

Operatively connected with the usual slotted portion 417 of each type bar, as shown in Fig. 20, is one of the usual bell cranks 418. These bell cranks are pivoted in a well known manner on a fulcrum wire 419 which is held in a slot 420 in a bell crank supporting casting 421 by means of a clamp 422. The bracket 421 is supported between the sides of the frame 386 in the second printing unit by means of screws 423. The usual slotted forwardly extending arm 424 of each bell crank 418 is engaged by a pin 425 provided in an upwardly extending projection 426 of one of the usual actuating or sub-levers 427. There are twelve of the actuating levers 427, one for each of the type bars in the segment 406, and all are pivoted on a common fulcrum bar 428 at the rear of the second printing unit (Fig. 21) and provided with the usual depending projection 430 to which are pivoted the usual actuating pawls 431.

Printing movement of each of the type bars 411 is effected in the usual manner by throwing its associated actuating pawl 431 into engagement with a toothed snatch roll 432 under the control of a controlling pawl in the control unit which will be hereinafter described. The usual adjustable stops 432ª insure a release or kicking-off of the actuating pawls from their engagement with the snatch roll. The snatch roll 432 is mounted on a shaft 433 journalled in the sides of the base section 385 of the second printing unit. The axis of the shaft 433 is directly in line with the axis of the shaft 357 of the snatch roll 358 in the main unit and extends beyond the right-hand side of the base section 385 into the space between the main and dual printing units as shown in Fig. 21. Fixedly mounted on the extended portion of the shaft 433 is a connecting member 434 which is provided with an eccentrically mounted pin 435 that engages with an opening 436 provided in the gear 360 as shown in Fig. 21. This connecting or locking pin 435 constitutes a crank arm by which the rotating movement of the snatch roll 358 in the main printing unit is transmitted to the snatch roll 432 in the dual printing unit so that the snatch rolls in both units may operate in unison and in effect constitute a single snatch roll.

Each of the actuating levers 427 is provided with a second depending projection 437 which coacts with a universal bar 438 to effect a moving of the printing ribbon into the path of the type bars each time one of said actuating levers is operated. This universal bar 438 takes the form of a bail having side arms 439 supported on a square shaft 440 which is pivoted to turn freely on a pair of adjustable pivot screws or pintles 441 secured in the sides of the upper frame 386. Extending forwardly as a continuation of each of the arms 439 is a stop arm 442 which coacts with a cross bar or rod 443 to limit the counter-clockwise movement of the universal bar 438. The movement of the universal bar 438 is transmitted by means of an upwardly extending arm 444 provided on the shaft 440 to a ribbon vibrating mechanism of any suitable type, such, for example, as that shown in the patent to Barr No. 1,153,668 referred to above, and designated as a whole in the present instance, by the reference numeral 445.

Except for the fact that the universal bar 438 and the shaft 440 are made shorter so that they may be mounted within the upper frame 386 of the second printing unit, the entire ribbon vibrating mechanism is the same as that usually employed in Remington machines, and the construction is such that a downward movement of the universal bar 438 will effect an upward movement of an arm 446 in the ribbon vibrating mechanism. This arm 446 is operatively connected with one of the usual ribbon carrying slides 447 which embraces the type guide 416 as shown in Fig. 22 and is provided with the usual looped ribbon carrying wire 448. A printing ribbon 450 passes through the carrying wire 448 and extends across the platen 368 to a ribbon carrier 451 associated with the type guide 375 in the main printing unit so that a single printing ribbon may be used in conjunction with both the main and second printing units in the present form of my invention. The ribbon feeding mechanism and the entire ribbon carrying and vibrating mechanism used in the main printing unit is the same as that usually employed in standard Remington bookkeeping machines, and therefore has not been shown in the present instance.

The control unit

Having thus described the general construction and lay-out of the main printing unit and the second printing unit used in the present embodiment of my invention, I shall now describe the control unit used in this form of my invention. This control unit constitutes the means for operatively connecting the main and second printing units so that upon a depression of a numeral key or one of the clearance proof character keys, "star" or "triangle", a printing of the corresponding character will be simultaneously effected at the separate printing points of both units.

Referring particularly to Fig. 18 it will be observed that the control unit which is designated as a whole by the reference numeral 454 comprises a pivot rod 455 extending in length from the right-hand side of the main unit to the left-hand side of the second printing unit and upon which is loosely mounted a series of operating levers. This pivot rod 455 is fixedly secured in a left-hand bracket 456 attached to the left-hand inner wall of the upper frame section 386, and a right-hand bracket 457 attached to the inner side of the right-hand wall of the upper frame 343 in the main unit. The two brackets 456 and 457 are the same as the bracket 112 described above in connection with the first form of my invention. In addition to being supported at the ends thereof the pivot rod 455 has another and intermediate support in the form of a special bracket 458 shown in Figs. 21 and 22. The bracket 458 is secured by means of screws 459 to a special supporting bracket 460 formed on the right-hand side of the upper frame 386 of the second printing unit, and said bracket 458 extends to the right through an opening 461 provided in the side of the main unit frame. Inside the frame of the main unit the bracket 458 is bent upwardly to form an ear having an opening 462 therein through which the pivot rod 455 passes, as shown in Fig. 22. Collars 463 provided on the pivot rod 455 adjacent the brackets 457 and 458 and held in their proper positions thereon by screws 464 prevent lateral displacement of the pivot rod 455 with respect to said brackets.

There are four specifically different types of operating levers mounted on the pivot rod 455, though all of the four types are constructed from the same basic operating lever structure as will presently appear. I shall now describe these operating levers.

The first type of operating lever, which is in the main the basic structure used for the other operating levers, is shown in perspective in Fig. 24, and designated as a whole by the reference numeral 465. This operating lever is provided with an opening 466 by which it is mounted to rock upon the pivot rod 455. An enlarged portion 467 extends downwardly from the left-hand end of the lever 465 and this enlarged portion constitutes a supporting plate upon which a controlling pawl 468 is pivoted, as at 469. As shown in Figs. 20 and 27 each controlling pawl 468 is substantially the same as those used in the other forms of my invention described above being resiliently held in a substantially horizontal position against a stop 470 by means of a spring 471. Each spring 471 is attached at one end to a pin 472 on the pawl 468 and at the other end to a pin 473 provided at the left end of the operating lever 465. The enlarged portion 467 to which a controlling pawl 468 is pivoted is the same in all of the different types of operating levers shown in Figs. 24, 25, 26 and 27 and hence corresponding reference numerals have been used to designate these identical parts in the different views. Extending to the right from the opening 466 in the lever 465 is an arm 474 which is used to guide the levers 465 and maintain them spaced apart when they are mounted on the rod 455 as will hereinafter appear.

In the present instance, there are twelve of these operating levers mounted on the portion of the pivot rod 455 which is within the second printing unit. These operating levers control the actuation of the type bars in the second printing segment and are mounted on the rod 455 so that the controlling pawls 468 thereof will lie over the actuating pawls 431, as shown in Fig. 20. These controlling pawls and their associated operating levers are shown in plan in Fig. 21, where, at the left-hand side thereof, designating characters have been applied to show the particular type bar which each operating lever controls. As shown in Figs. 20 and 21 the forwardly extending arm 474 of each of the twelve operating levers 465 registers with a slot provided in a guide comb 475 at the front of the second printing unit, said guide comb being secured by means of screws 476 to a cross bar 477 extending between the sides of the upper frame 386 and attached thereto by the screws 478. This guide comb 475 aids in guiding the twelve operating levers 465 in their operating movements as will be hereinafter more fully described, and also serves as a means for maintaining said operating levers in their proper spaced positions on the rod 455.

As stated above the numeral type bars in the main printing unit are spaced at substantially regular intervals along the arc of the main segment 371 and likewise the operating levers controlling the actuation of these numeral type bars in the main segment are spaced at regular intervals along the rod 455 within the main printing unit. Referring jointly to Figs. 22 and 23 it will be observed that an operating lever 480 for a numeral type bar in the main printing unit is mounted on the rod 455 adjacent each of the actuating pawls 376 for the numerals "0" to "9". Thus, every fourth operating lever on the rod 455 in the main unit is an operating lever 480 and according to the numeral type bars which said levers control, they are arranged on the rod 455 in the following order reading from left to right in Figs. 22 and 23; "1", "2", "3", "4", "5", "6", "7", "8", "9", and "0".

One of the operating levers 480 is shown in detail perspective in Fig. 27 and, as there shown and indicated by the corresponding reference numerals, the left-hand portion of said lever is the same as the lever 465 described above. However, instead of being provided with a straight guiding arm 474 the lever 480 is provided with an arm 481 which is bent laterally (or to the right as shown in Fig. 18) and has pivoted at the end thereof by means of a headed pin 482 a roller 483. The purpose of bending each of the arms 481 is to bring the roller 483, which corresponds to one of the rollers 126 or 148 described above, in line with the associated cam 352 on the shaft 353.

Mounted on the pivot rod 455 to the right of the operating levers 480, as shown in Figs. 18 and 23, are two operating levers 484 for the clearance proof characters "star" and "triangle" in the main printing unit. One of these levers is shown in detail in Fig. 26 where it will be observed that in the portion of said lever to the left of the opening 466 there is provided a pin 485 which corresponds to any one of the pins 157, 165 and 173 described above. This pin 485 cooperates with a depending projection provided on the key lever for the associated clearance proof character in the same manner as described above for the other forms of my invention.

Each of the above described operating levers 480 and 484 for the numeral type bars and the clearance proof character type bars respectively in the main printing unit, is directly connected to its associated operating lever 465 in the second printing unit by means of an interconnecting bail comprising a cross bar 486 and left and right-hand upwardly extending arms 487 and 488 respectively. The interconnecting bail for the numeral "1" type bars in both segments has the arms 487 and 488 thereof spot welded, or secured by any other suitable means, to the central portions of the operating levers 465 and 480 respectively for said numeral type bars. The cross bar 486 of said bail occupies a substantially horizontal position passing through the opening 461 in the base of the main unit and an opening 499 in the base section of the second printing unit, as shown in Figs. 22 and 23. The interconnecting bails for the "2", "3", "4", "5", "6", "7", "8", "9", "0", "star" and "triangle" type bars in both the second and main printing segments are substantially the same in their construction and manner of attachment to the associated operating levers as that just described above for the numeral "1" type bars. However, the arms 487 and 488 and cross bars 486 of each of the bails for the remaining operating levers in both units and a cross bar 486 thereof are made progressively longer so that when all of the operating members for the numeral and clearance proof character type bars in both the main and second printing units are in normal position, the interconnecting bails thereof will occupy an internested relation as shown in Figs. 20, 22 and 23. Thus, the operating levers for the numeral and clearance proof characters in the second printing unit are operatively connected with the associated operating levers in the main printing unit so that when a numeral or clearance proof character key is depressed in the keyboard of the main unit an actuating pawl 376 in the main unit and a pawl 431 in the second printing unit will be thrown, substantially simultaneously, into engagement with their snatch rolls 358 and 432 respectively to effect a printing at two different points along the platen 368.

Having thus described the operating levers for the numeral and clearance proof character type bars in both the second and main printing units of this last described construction, I shall now describe the construction of the operating levers which control the actuation of the remaining type bars in the main segment.

Mounted on the pivot rod 455 within the main printing unit adjacent each of the alphabet or special character key levers is an operating lever 491. One of these levers 491 is shown in perspective in Fig. 25 where it will be seen, from the reference numerals applied thereto, that the left-hand portion of said lever corresponds in all its details of construction to the left-hand portion of one of the levers 484 for the clearance proof character type bars and like said lever 484 is provided with a pin 485 which coacts with a depending projection on the associated key lever. Instead of being provided with a mere bearing opening like the opening 466 for mounting the lever 484 on the rod 455, the lever 491 is provided with a hubbed bearing member 492. As shown in Fig. 19 this hubbed bearing member 492 is fixedly secured as at 493 to the lever 491 extending to the right therefrom and has an opening 495 of the same diameter as the opening 466. Aside from acting as a bearing portion for each of the operating levers 491, the hubbed bearing portion 492 constitutes a means for separating the operating levers, together with the parts carried thereby, one from another and thus preventing any interference in the operating movements of the parts associated therewith.

When all of the operating levers 480, 484 and 491 are mounted on the rod 455 within the main printing unit, they are held thereon by means of a collar 496 which is secured to said rod by means of a screw 497 (Fig. 19). Each of the levers 480 or 484 is separated from an adjacent lever 491 by means of a spacing sleeve 498 which is interposed on the pivot rod between the arm 488 of the associated interconnecting bail and the side of the lever 491, as shown in Figs. 18, 19 and 23. Fig. 18 shows the entire control unit comprising the pivot rod 455 and all the operating levers mounted thereon in its proper position within the frame work of both the main and second printing units, the dot and dash lines in said figure being intended to represent the interconnecting bails extending from the operating levers for the numeral and clearance proof character keys or type bars in the main unit to the corresponding operating levers in the second printing unit. As was hereinbefore pointed out the interconnecting bails, aside from constituting a means for actuating a control or operating lever in the second printing unit substantially simultaneously with its corresponding operating lever in the main unit, also aid in maintaining the operating levers 465 in their proper spaced position on the rod 455 within the second printing unit.

It is to be understood that each operating lever, whether for numeral, alphabet or special character type bar, is provided with an enlarged portion 467 on the forward side of the rod 455 upon which the levers are mounted; and that each enlarged portion 467 has mounted thereon one of the controlling pawls 468. The controlling pawls 468 in the main unit cooperate with the actuating pawls 376 while the controlling pawls 468 in the second printing unit cooperate with the actuating pawls 431. Guide combs 500 (Fig. 20) are provided in both the main and second printing units for guiding these controlling pawls 468 in their operating movements. The guide combs 500 are carried by a supporting bar 501 which is supported by arms 502 provided on each of the brackets 456, 457 and 458, as shown in Figs. 18 and 22. The supporting bar or plate 501 extends across the entire width of the control unit having its end fixed in the brackets 456 and 457, as pointed out above, and serves to maintain the control unit as a unitary structure mounted within said brackets. Thus, it will be apparent that by removing the brackets 456 and 457, together with the bracket 458, the entire control unit may be removed as a single piece of mechanism. In this manner this rather complicated piece of mechanism may be assembled outside the machine and mounted therein in its proper position as a single unit.

It will be understood that the operation of the various operating levers in the control unit is the same as has been described above for the operating levers in the control units of the other forms of my invention; and likewise, the resultant actuation of the engaging or actuating pawls associated with each of the controlling pawls on the operating levers and the actuation of the type bars is the same as has been described above. It will be also understood that by depressing one of the numeral or clearance proof character keys in the keyboard of the main unit, a printing may be effected by means of the corresponding type bars in both the main and second printing units, at separate and distinct printing points on the platen 368 or interposed work sheet or sheets.

Silencing mechanism

Since a dual printing machine of the character described above having a full complement of type bars in the main unit thereof is capable of a wide range of usage, and there will be times when the main unit alone is needed for operation, it will be desirable to provide means for silencing the operation of the type bars in the second printing unit. Hence, I have provided within the second printing unit of this form of my invention a silencing bail 505 like the bail 214 described above. This bail is shown in Fig. 20 where it will be seen that it is mounted on the shaft 443 and connected by a link 506 to a bell crank 507 (Fig. 18) pivoted at 508 in a bracket 509 mounted at the rear of the upper frame section 386 of the second printing unit. A link 510 connects the other arm of the bell crank 507 to a crank arm 511 mounted on a rock shaft 512 which is journalled in a bracket 513 on the rear of the tabulator frame which in turn is secured to the upper swingable frame section of the main printing unit. The rock shaft 512 is the same as the rock shaft 221, shown in Fig. 11, and likewise is connected to or cooperative with a corresponding mechanism at the top of the machine including a cam 239 mounted on the usual tabulator stop bar, as hereinbefore described. For the purposes of the present description it will be assumed that the mechanism shown in Fig. 11 comprising the cam 239 and the associated roller 238 is mounted on top of the tabulator frame of the upper section of the main unit 340, shown in Fig. 18. The construction is such that when the roller 238 is in engagement with the cam 239 the silencing bail 505 will be lowered to allow the controlling pawls 468 in the second printing unit to come in contact with the usual projections on the actuating pawls 431 and render the second printing unit effective. As soon as the carriage 367 moves to a position in which the roller 238 is not engaged by the cam 239 the silencing bail 505 will move upward under the urge of the spring 505ᵃ and thus carry the controlling pawls 468 to inoperative position. Fig. 20 shows the silencing bail 505 in its lower position when the roller 238 is engaged by the cam 239 and the controlling pawls 468 are in their operative position. As in the other forms of my invention described above the position of the carriage and the length of the cam 239 and its position on the tabulator stop bar, determine when the type bars of the second printing unit will be operated.

It is to be understood that in all of the above described forms of my invention there are the following important and advantageous similarities in construction:—

1. The control unit constitutes a controlling means controlled by a single actuation of each printing key for bringing about an engagement of a plurality of actuating pawls with the snatch roll.

2. Regardless of the number of sets of type bars and the number of such type bars in each set, a separate actuating means is provided for each type bar which comprises an actuating pawl, and actuating lever, each pawl being adapted to be thrown individually, though substantially simultaneously with the pawls for corresponding type bars in different sets, into engagement with a power driven actuating roller.

3. The frame structure, in each instance, comprises a base section which carries the power driving devices and an upper section which is hinged to said lower or base section and carries the different sets of printing instrumentalities, the key levers, the control unit, the silencing mechanism, etc., the construction being such that when the upper section is closed upon the base section the cooperating parts thereof carried by the two sections will be brought into cooperative relation ready to function. For example, referring to Fig. 1 it will be seen that the depending arm 71 in the upper section will be brought into position to coact with the trip lever 77 in the base section, the actuating arms 95 will rest upon the cams 65 and the actuating pawls 184 will be placed in cooperative relation with the actuating roller 63.

4. Each of the constructions is such that the type bars in the segment controlling the escapement mechanism will preferably be actuated a fraction of a second after the type bars in the other segments, thus insuring a proper printing from the type bars on each segment since the carriage will not escape before imprints have been effected from all of the actuated type bars.

5. In each instance the control unit, comprising the fixed pivot rod and the various operating levers, controlling pawls and connecting bails carried thereby, is mounted in brackets in the upper frame section and may be removed as a separate unit from the machine by merely detaching the brackets.

6. In each instance a section of a regular type bar segment is employed, together with the associated type bars, sub-levers and key levers such as are used in a standard machine, thereby utilizing standard parts of existing machines.

7. In all of the constructions shown the same character of silencing mechanism may be employed when desired.

From the foregoing description it will be apparent that by the various forms of my invention shown and described herein, I have provided improved means whereby identical entries may be made simultaneously in a plurality of columns on a work sheet or sheets by the actuation of a single set of printing keys.

It will be apparent, moreover, that I have provided comparatively simple and highly effective means for attaining the ends set forth and that the invention may be embodied in existing machines, such for example as the No. 85 Remington Electrified Bookkeeping Machine without materially modifying the existing structural features thereof which remain in the machine.

Furthermore, by making the control unit of nested elements in the manner disclosed herein, I am enabled to provide a compact and comparatively simple construction without danger of conflict between the different elements thereof and involving means which will properly coact with existing widely separated elements in the machine without modification, or material modification of such existing elements.

Although, in the present instance, I have shown only three of the preferred forms of my invention, it is nevertheless to be understood that various changes may be made in the construction and certain features thereof may be employed without others without departing from my invention as it is defined in the accompanying claims.

What I claim as new and desire to secure by Letters Patent is:

1. The combination of a carriage, a plurality of sets of printing instrumentalities, a set of printing keys, means controlled thereby for selectively and simultaneously actuating printing instrumentalities of different sets, and silencing means for rendering said printing keys ineffective to bring about an actuation of the printing instrumentalities of one or more sets without interfering with the effectiveness of said keys to bring about an actuation of the printing instrumentalities of the remaining set or sets, said silencing means including means by which it is automatically rendered effective or ineffective depending on the position of the carriage in its line of travel and including adjustable means that enable the point in the travel of the carriage where such means function to be varied as desired.

2. The combination of a platen, a plurality of sets of type bars that coact with the platen, the type bars of each set having a printing center that differs from the printing center of the other set or sets of type bars, a set of printing keys for all of said type bars, and actuating means controlled by said keys for selectively and simultaneously actuating corresponding type bars of different sets for simultaneously printing the same character at different portions of a work sheet or on different sheets on the operation of a single key, said actuating means including a power driven member, connecting devices for operatively connecting each of said type bars to said power driven member to be actuated thereby, and means for operatively connecting said connecting devices for corresponding type bars in different sets to be operated in unison.

3. The combination of a platen, a plurality of sets of type bars that coact with the platen, the type bars of each set having a printing center that differs from the printing center of the other set or sets of type bars, a set of printing keys for all of said type bars, and actuating means controlled by said keys for selectively and simultaneously actuating corresponding type bars of different sets for simultaneously printing the same character at different portions of a work sheet or on different sheets on the operation of a single key, said actuating means including a power driven member, connecting devices for operatively connecting each of said type bars to said power driven member to be actuated thereby, means for operatively connecting said connecting devices for corresponding type bars in different sets to be operated in unison, and means for rendering certain only of said connecting devices ineffective to be actuated by said power driven member while other of said connecting devices controlled by the same key are effective, whereby one set of type bars may be actuated to the exclusion of another set or sets.

4. The combination of a carriage, a platen, a plurality of sets of type bars that coact with the platen, a plurality of sets of type bars that coact with the platen, the type bars of each set having a printing center that differs from the printing center of the other set or sets of type bars, a set of printing keys for all of said type bars, and actuating means controlled by said keys for selectively and simultaneously actuating corresponding type bars of different sets for simultaneously printing the same character at different portions of a work sheet or on different sheets on the operation of a single key, said actuating means including a power driven member, connecting devices for operatively connecting each of said type bars to said power driven member to be actuated thereby, means for operatively connecting said connecting devices for corresponding type bars in different sets to be operated in unison, and means for rendering certain only of said connecting devices ineffective to be actuated by said power driven member while other of said connecting devices controlled by the same key are effective, whereby one set of type bars may be actuated to the exclusion of another set, the construction and arrangement of the parts being such that the position of the carriage in its line of travel determines when one set of type bars may be actuated to the exclusion of another set or sets.

5. The combination of a platen, a plurality of sets of printing instrumentalities that coact with said platen, the printing instrumentalities of each set having a common printing center that differs from the printing center of the other sets of printing instrumentalities, a set of printing keys for all of said printing instrumentalities, and power actuated means controlled by said keys for selectively and simultaneously actuating printing instrumentalities of different sets in order to simultaneously effect imprints at different portions of a work sheet or on different sheets, said means including a continuously running power driven actuating roller, and connecting means controlled by each of said printing keys for operatively connecting a printing instrumentality of each of said sets to said roller to be actuated thereby.

6. The combination of a platen, a plurality of sets of printing instrumentalities that coact with said platen, the printing instrumentalities of each set having a common printing center that differs from the printing center of the other sets of printing instrumentalities, a set of printing keys for all of said printing instrumentalities, and power actuated means controlled by said keys for selectively and simultaneously actuating printing instrumentalities of different sets in order to simultaneously effect imprints at different portions of a work sheet or on different sheets, said means including a continuously running power driven actuating roller, connecting means controlled by each of said printing keys for operatively connecting a printing instrumentality of each of said sets to said roller to be actuated thereby, and means shiftable into and out of cooperative relation with some of said connecting means for rendering them effective or ineffective.

7. The combination of a platen, a plurality of sets of printing instrumentalities that coact with said platen, the printing instrumentalities of each set having a common printing center that differs from the printing center of the other sets of printing instrumentalities, a set of printing keys for all of said printing instrumentalities, and power actuated means controlled by said keys for selectively and simultaneously actuating printing instrumentalities of different sets in order to simultaneously effect imprints at different portions of a work sheet or on different work sheets, said means comprising a power driven member and controlling means including nested actuating bails for bringing about an operative connection between said printing instrumentalities and said power driven member, each of said bails controlling the operation of a plurality of printing instrumentalities in different sets, and means coacting with said controlling means for one set of printing instrumentalities for rendering such controlling means effective or ineffective as desired.

8. The combination of a platen, a plurality of sets of printing instrumentalities that coact with said platen, the printing instrumentalities of each set having a common printing center that differs from the printing center of the other sets of printing instrumentalities, a set of printing keys for all of said printing instrumentalities, and power actuated means controlled by said keys for selectively and simultaneously actuating printing instrumentalities of different sets in order to simultaneously effect imprints at different portions of a work sheet or on different sheets, said means comprising a power driven member, and controlling means including nested actuating bails for bringing about an operative connection between said printing instrumentalities and said power driven member, each of said bails controlling the operation of a plurality of printing instrumentalities in different sets, and carriage controlled means coacting with said controlling means for one set of printing instrumentalities for rendering such controlling means effective or ineffective as determined by the position of the carriage in its line of travel.

9. The combination of a carriage having a step-by-step letter space movement, a plurality of sets of printing instrumentalities, the printing instrumentalities of each set having a common printing center that differs from that of the remaining set or sets, a set of printing keys, and power actuated means for simultaneously effecting an operation of printing instrumentalities of a plurality of sets by an actuation of any one of said printing keys, said power actuated means comprising a power driven snatch roll, an actuating pawl for each printing instrumentality adapted to engage and be actuated by said snatch roll, and controlling means controlled by a single actuation of each printing key for bringing about an engagement of a plurality of said pawls with the snatch roll.

10. The combination of a carriage having a step-by-step letter space movement, a plurality of sets of printing instrumentalities, the printing instrumentalities of each set having a common printing center that differs from that of the remaining set or sets, a set of printing keys, and power actuated means for simultaneously effecting an operation of printing instrumentalities of a plurality of sets by an actuation of any one of said printing keys, said power actuated means comprising a power driven snatch roll, an actuating pawl for each printing instrumentality adapted to engage and be actuated by said snatch roll, controlling means controlled by a single actuation of each printing key for bringing about an engagement of a plurality of said pawls with the snatch roll, and silencing means by which some only of said controlling means may be rendered ineffective on the associated pawls to provide for simultaneously writing in varying numbers of columns depending on the effectiveness or ineffectiveness of said silencing means.

11. The combination of a carriage having a step-by-step letter space movement, a plurality of sets of printing instrumentalities, the printing instrumentalities of each set having a common printing center that differs from that of the remaining set or sets, a set of printing keys, and power actuated means for simultaneously effecting an operation of printing instrumentalities of a plurality of sets by an actuation of any one of said printing keys, said power actuated means comprising a power driven snatch roll, an actuating pawl for each printing instrumentality adapted to engage and be actuated by said snatch roll, controlling means controlled by a single actuation of each printing key for bringing about an engagement of a plurality of said pawls with the snatch roll, and silencing means controlled by the travel of the carriage and by which some only of said controlling means may be rendered ineffective on the associated pawls to provide for simultaneously writing in varying numbers of columns depending on the effectiveness or ineffectiveness of said silencing means.

12. The combination of a carriage having a step-by-step letter space movement, a plurality of sets of printing instrumentalities, the printing instrumentalities of each set having a common printing center that differs from that of the remaining set or sets, a set of printing keys, and actuating means for simultaneously effecting an operation of printing instrumentalities of a plurality of sets by an actuation of any one of said printing keys, said actuating means comprising intermediate operative connections between each printing key and a plurality of printing instrumentalities in different sets, and means controlled by the travel of the carriage for rendering ineffective the actuating connections for certain only of the printing instrumentalities, said carriage controlled means including adjustable means that enable the point in the travel of the carriage where such means function to be varied as desired, whereby a varying number of printing instrumentalities are controlled by each key depending on the position of the carriage in its line of travel.

13. The combination of a carriage having a step-by-step letter space movement, a plurality of sets of printing instrumentalities, the printing instrumentalities of each set having a common printing center that differs from that of the remaining set or sets, a set of printing keys, and power actuated means for simultaneously effecting an operation of printing instrumentalities of a plurality of sets by an actuation of any one of said printing keys, said power actuated means comprising a power driven snatch roll, an actuating pawl for each printing instrumentality adapted to engage and be actuated by said snatch roll, a controlling pawl for each actuating pawl, means for operatively connecting a controlling pawl of one set of printing instrumentalities with the corresponding controlling pawl of another set of printing instrumentalities, whereby the connected controlling pawls will operate in unison, and means controlled by said printing keys for controlling the actuation of said controlling pawls.

14. The combination of a carriage having a step-by-step letter space movement, a plurality of sets of printing instrumentalities, the printing instrumentalities of each set having a common printing center that differs from that of the remaining set or sets, a set of printing keys, and power actuated means for simultaneously effecting an operation of printing instrumentalities of a plurality of sets by an actuation of any one of said printing keys, said power actuated means comprising a power driven snatch roll, an actuating pawl for each printing instrumentality adapted to engage and be actuated by said snatch roll, a controlling pawl for each actuating pawl, means for operatively connecting a controlling pawl of one set of printing instrumentalities with the corresponding controlling pawl of another set of printing instrumentalities, whereby the connected controlling pawls will operate in unison, means controlled by said printing keys for controlling the actuation of said controlling pawls, and silencing means for shifting certain only of said controlling pawls to and for maintaining them in ineffective position while enabling the remaining controlling pawls to function independently thereof.

15. The combination of a carriage having a step-by-step letter space movement, a plurality of sets of printing instrumentalities, the printing instrumentalities of each set having a common printing center that differs from that of the remaining set or sets, a set of printing keys, and power actuated means for simultaneously effecting an operation of printing instrumentalities of a plurality of sets by an actuation of any one of said printing keys, said power actuated means comprising a power driven snatch roll, an actuating pawl for each printing instrumentality adapted to engage and be actuated by said snatch roll, a controlling pawl for each actuating pawl, means for operatively connecting a controlling pawl of one set of printing instrumentalities with the corresponding controlling pawl of another set of printing instrumentalities, whereby the connected controlling pawls will operate in unison, means controlled by said printing keys for controlling the actuation of said controlling pawls, and silencing means controlled by the travel of the carriage for shifting certain only of said controlling pawls to and for maintaining them in ineffective position while enabling the remaining controlling pawls to function independently thereof, thereby bringing about the simultaneous printing in a number of columns when the carriage is in one position or zone of its travel and bringing about an entry in only a single column when the carraige is in another position or zone of travel.

16. The combination of a carriage having a step-by-step letter space movement, a plurality of sets of printing instrumentalities, the printing instrumentalities of each set having a common printing center that differs from that of the remaining set or sets, a set of printing keys, and power actuated means for simultaneously effecting an operation of printing instrumentalities of a plurality of sets by an actuation of any one of said printing keys, said power actuated means comprising a power driven snatch roll, an actuating pawl for each printing instrumentality adapted to engage and be actuated by said snatch roll, a controlling pawl for each actuating pawl, means for operatively connecting a controlling pawl of one set of printing instrumentalities with the corresponding controlling pawl of another set of printing instrumentalities, whereby the connected controlling pawls will operate in unison, power actuated means for actuating said controlling pawls, and means controlled by said printing keys for controlling the actuation of said last mentioned power actuated means.

17. The combination of a carriage having a step-by-step letter space movement; a plurality of sets of printing instrumentalities, the printing instrumentalities of each set having a common printing center that differs from that of the remaining set or sets; a set of printing keys; power actuated means for simultaneously effecting an operation of printing instrumentalities of a plurality of sets by an actuation of any one of said printing keys, said power actuated means comprising a power driven snatch roll, an actuating pawl for each printing instrumentality adapted to engage and be actuated by said snatch roll, a controlling pawl for each actuating pawl, means for operatively connecting a controlling pawl of one set of printing instrumentalities with the corresponding controlling pawl of another set of printing instrumentalities, whereby the connected controlling pawls will operate in unison, power actuated means for actuating said controlling pawls, and means controlled by said printing keys for controlling the actuation of said last mentioned power actuated means; a shiftable bail that coacts with the controlling pawls for one set only of printing instrumentalities and is operative thereon to control the movement thereof into and out of cooperative relation with their associated actuating pawls; and means for controlling the shifting of said bail.

18. The combination of a carriage having a step-by-step letter space movement; a plurality of sets of printing instrumentalities, the printing instrumentaalities of each set having a common printing center that differs from that of the remaining set or sets; a set of printing keys; power actuated means for simultaneously effecting an operation of printing instrumentalities of a plurality of sets by an actuation of any one of said printing keys, said power actuated comprising a power driven snatch roll, an actuating pawl for each printing instrumentality adapted to engage and be actuated by said snatch roll, a controlling pawl for each actuating pawl, means for operatively connecting a controlling pawl of one set of printing instrumentalities with the corresponding controlling pawl of another set of printing instrumentalities, whereby the connected controlling pawls will operate in unison, power actuated means for actuating said controlling pawls, and means controlled by said printing keys for controlling the actuation of said last mentioned power actuated means; a shiftable bail that coacts with the controlling pawls for one set only of printing instrumentalities and is operative thereon to control the movement thereof into and out of cooperative relation with their associated actuating pawls; and means controlled by the travel of the carriage for automatically shifting said bail.

19. The combination of a main frame for a machine having a type bar segment mounted therein, said segment having a full complement of alphabet and numeral type bars, an auxiliary frame secured to one side of the main frame and having a type bar segment having a complement of numeral type bars only carried thereby, printing keys, actuating means for all of said type bars, and control means for effecting an operation of the actuating means for corresponding numeral type bars in both the main and auxiliary frames by the actuation of a single numeral prining key and for a single alphabet type bar only on the actuation of an alphabet printing key.

20. The combination of a set of alphabet printing instrumentaliites, a plurality of sets of numeral printing instrumentalities, a single set of printing keys including alphabet and numeral keys, actuating means for all of said printing instrumentalities and control means for effecting an actuation of the numeral printing instrumentalities in a plurality of sets upon the actuation of a single numeral key and for effecting an actuation of a single alphabet printing instrumentality upon the actuation of an alphabet key.

21. The combination of a set of alphabet printing instrumentalities, a plurality of sets of numeral printing instrumentalities, a single set of printing keys including alphabet and numeral keys, power actuated means for actuating both numeral and alphabet type bars, and control means for effecting an actuation of the numeral printing instrumentalities in a plurality of sets upon the actuation of a single numeral key and for effecting an actuation of a single alphabet printing instrumentality upon the actuation of an alphabet key.

22. The combination of a platen, a plurality of sets of printing instrumentalities that coact with said platen, the printing instrumentalities of each set having a common printing center that differs from the printing center of the other sets of printing instrumentalities, a set of printing keys for all of said printing instrumentalities, and power actuated means controlled by said keys for selectively and simultaneously actuating printing instrumentalities of different sets in order to simultaneously effect imprints at different portions of a work sheet or on different sheets, said means comprising a power driven member, controlling means including nested actuating bails for bringing about an operative connection between said printing instrumentalities and said power driven member, each of said bails controlling the operation of a plurality of printing instrumentalities in different sets, and means for supporting and uniting said nested bails, whereby they may be introduced into the machine or removed therefrom as a separate unit.

23. The combination of a carriage having a step-by-step letter space movement, a plurality of sets of printing instrumentalities, the printing instrumentalities of each set having a common printing center that differs from that of the remaining set or sets, a set of printing keys, and power actuated means for simultaneously effecting an operation of printing instrumentalities of a plurality of sets by an actuation of any one of said printing keys, said power actuated means comprising a power driven snatch roll, an actuating pawl for each printing instrumentality adapted to engage and be actuated by said snatch roll, controlling means controlled by a single actuation of each printing key for bringing about an engagement of a plurality of said pawls with the snatch roll, and means that enable said controlling means to be introduced into the machine as a separate unit.

24. The combination of a carriage having a step-by-step letter space movement, a plurality of sets of printing instrumentalities, the printing instrumentalities of each set having a common printing center that differs from that of the remaining set or sets, a set of printing keys, and power actuated means for simultaneously effecting an operation of printing instrumentalities of a plurality of sets by an actuation of any one of said printing keys, said power actuated means comprising a power driven snatch roll, an actuating pawl for each printing instrumentality adapted to engage and be actuated by said snatch roll, a controlling pawl for each actuating pawl, means for operatively connecting a controlling pawl of one set of printing instrumentalities with the corresponding controlling pawl of another set of printing instrumentalities, whereby the connected controlling pawls will operate in unison, means controlled by said printing keys for controlling the actuation of said controlling pawls, and means that enable said controlling pawls and the means for connecting the controlling pawls to be introduced into the machine as a single unit.

25. The combination of a plurality of printing instrumentalities, keys for controlling the actuation thereof, a carriage, and means for varying the number of printing instrumentalities controlled by the actuation of each key depending on the position of the carriage in its line of travel, said last mentioned means including adjustable means that enable the point in the travel of the carriage where such means function to be varied as desired.

GEORGE G. GOING.

CERTIFICATE OF CORRECTION.

Patent No. 2,138,151. November 29, 1938.

GEORGE G. GOING.

It is hereby certified that error appears in the printed specification of the above numbered patent requiring correction as follows: Page 20, first column, lines 67 and 68, claim 4, strike out the words and comma "a plurality of sets of type bars that coact with the platen,"; page 22, first column, line 41, claim 15, for "carraige" read carriage; and second column, line 25, claim 18, for "instrumentaalities" read instrumentalities; line 64, claim 19, for "prining" read printing; and that the said Letters Patent should be read with this correction therein that the same may conform to the record of the case in the Patent Office.

Signed and sealed this 7th day of February, A.D. 1939.

Henry Van Arsdale.

(Seal) Acting Commissioner of Patents.